(12) United States Patent
Vargas et al.

(10) Patent No.: US 10,211,909 B2
(45) Date of Patent: Feb. 19, 2019

(54) LINK ADAPTATION WITH RF INTERMEDIARY ELEMENT

(71) Applicant: QUALCOMM Incorporated, San Diego, CA (US)

(72) Inventors: Jose Edson Vargas, San Diego, CA (US); Jun Ma, San Diego, CA (US); Jelena Damnjanovic, Del Mar, CA (US); Iyab Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 15/640,183

(22) Filed: Jun. 30, 2017

(65) Prior Publication Data

US 2019/0007129 A1    Jan. 3, 2019

(51) Int. Cl.
*H04B 7/155* (2006.01)
*H04B 7/185* (2006.01)
(Continued)

(52) U.S. Cl.
CPC ....... *H04B 7/15542* (2013.01); *H04B 7/1858* (2013.01); *H04B 7/18584* (2013.01); *H04B 7/18586* (2013.01); *H04B 17/382* (2015.01); *H04B 17/40* (2015.01); *H04L 5/0035* (2013.01); *H04L 5/0069* (2013.01);
(Continued)

(58) Field of Classification Search
CPC .... H04B 7/14–7/216; H04B 17/0082–17/409; H04L 5/003–5/0098; H04W 16/02–16/12; H04W 24/02–24/10; H04W 28/02–28/0263; H04W 28/06; H04W 48/02–48/20; H04W 52/04–52/60; H04W 72/005–72/14;
(Continued)

(56) References Cited

U.S. PATENT DOCUMENTS 4,941,199 A    7/1990  Saam
6,813,476 B1  11/2004  Brooker
(Continued)

FOREIGN PATENT DOCUMENTS

WO    WO-2008129509 A1    10/2008

OTHER PUBLICATIONS

International Search Report and Written Opinion—PCT/US2018/035604—ISA/EPO—dated Aug. 14, 2018.

*Primary Examiner* — Timothy J Weidner
(74) *Attorney, Agent, or Firm* — Paradice and Li LLP

(57) ABSTRACT

A method and apparatus for link adaptation in a satellite communication system, wherein a satellite is configured to receive reverse-link (RL) communications from a user terminal (UT) via a service link and retransmit the RL communications to a satellite access network (SAN) via a feeder link. The SAN may select a reference location for the UT within a footprint of the satellite, and determine a set of operating parameters for the RL communications to achieve a target power efficiency of the satellite based on the reference location. The SAN may dynamically adjust one or more of the operating parameters, while maintaining the target power efficiency of the satellite, based at least in part on channel conditions in at least one of the service link, the feeder link, or a combination thereof. Among other advantages, the method disclosed herein may optimize RL communications based on the capabilities of the satellite.

30 Claims, 15 Drawing Sheets

(51) Int. Cl.
  *H04B 17/382* (2015.01)
  *H04B 17/40* (2015.01)
  *H04L 5/00* (2006.01)
  *H04W 16/10* (2009.01)
  *H04W 24/02* (2009.01)
  *H04W 24/04* (2009.01)
  *H04W 28/02* (2009.01)
  *H04W 28/06* (2009.01)
  *H04W 52/18* (2009.01)
  *H04W 52/30* (2009.01)
  *H04W 52/46* (2009.01)
  *H04W 72/04* (2009.01)
  *H04W 84/04* (2009.01)
  *H04W 84/06* (2009.01)
  *H04W 88/08* (2009.01)

(52) U.S. Cl.
  CPC ........... *H04L 5/0096* (2013.01); *H04W 16/10* (2013.01); *H04W 24/02* (2013.01); *H04W 24/04* (2013.01); *H04W 28/0247* (2013.01); *H04W 28/06* (2013.01); *H04W 52/18* (2013.01); *H04W 52/30* (2013.01); *H04W 52/46* (2013.01); *H04W 72/044* (2013.01); H04W 84/045 (2013.01); H04W 84/06 (2013.01); H04W 88/085 (2013.01)

(58) Field of Classification Search
  CPC ..... H04W 84/045–84/06; H04W 88/08–88/10
  See application file for complete search history.

(56) References Cited

U.S. PATENT DOCUMENTS

| | | |
|---|---|---|
| 7,630,683 B2 | 12/2009 | De |
| 7,885,342 B2 | 2/2011 | Brainos et al. |
| 8,259,604 B2 | 9/2012 | Lincoln et al. |
| 8,787,263 B2 | 7/2014 | Park et al. |
| 8,818,446 B2 | 8/2014 | Ben et al. |

LINK ADAPTATION WITH RF INTERMEDIARY ELEMENT

INTRODUCTION

Various aspects described herein relate to wireless communications, and more particularly to link adaptation in wireless communication systems with an intermediary element between transmitting and receiving devices.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, GSO satellite-based communications have relatively large round-trip delays (~500 ms) and tend to incur relatively high levels of attenuation. Moreover, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Each satellite may act as a transponder or repeater for communications between a user terminal and a satellite access network (e.g., a network of gateways, controllers, and other elements that communicate with the user terminal via satellite). For example, the satellite may receive reverse-link (RL) communications from a user terminal via a service link (e.g., communication channel between the satellite and the user terminal), and may retransmit the RL communications to the satellite access network via a feeder link (e.g., communication channel between the satellite and the satellite access network). A conventional "bent pipe" satellite may perform frequency conversion and power amplification when retransmitting a received communication signal, but typically does not perform any additional digital processing on the RL communication signals.

Rain fade, antenna beam pointing errors, line-of-sight blockage, Doppler effects, and other sources of RF disturbance may cause signal attenuation in the feeder link and/or service link. In conventional link adaptation schemes (e.g., where a transmitting device communicates directly with a receiving device), it is possible to compensate for signal attenuation by adjusting one or more transmission parameters of the transmitting device to directly adapt to signal degradation at the receiving device. However, because the satellite acts as an RF intermediary (e.g., transponder) between the user terminal and the satellite access network, the performance of the satellite should be accounted for when performing link adaptation in a satellite communication system. More specifically, it may be desirable to maintain efficient operation of the satellite (e.g., by optimizing power efficiency) when compensating for RF disturbances in the service link and/or the reverse link.

SUMMARY

Aspects of the disclosure are directed to apparatuses and methods for performing reverse link adaptation in a satellite communication system, wherein a satellite is configured to receive reverse-link (RL) communications from a user terminal (UT) via a service link and retransmit the RL communications to a satellite access network (SAN) via a feeder link. In one example, a method of link adaptation is disclosed. The method may include determining a reference location for the UT within a footprint of the satellite, determining a set of operating parameters for the RL communications to achieve a target power efficiency of the satellite based on the reference location for the UT, and dynamically adjusting one or more of the operating parameters, while maintaining the target power efficiency of the satellite, based at least in part on channel conditions in at least one of the service link, the feeder link, or a combination thereof. Among other advantages, the method disclosed herein may optimize RL communications between the UT and the SAN based on the capabilities and/or limitations of the satellite.

In another example, a satellite access network is disclosed. The SAN may include one or more processors and a memory configured to store instructions. Execution of the instructions by the one or more processors may cause the SAN to select a reference location for a UT within a footprint of a satellite of a satellite communication system, determine a set of operating parameters for the RL communications to achieve a target power efficiency of the satellite based on the reference location for the UT, and dynamically adjust one or more of the operating parameters, while maintaining the target power efficiency of the satellite, based at least in part on channel conditions in at least one of the service link, the feeder link, or a combination thereof. Among other advantages, the satellite access network disclosed herein may optimize RL communications between the UT and the SAN based on the capabilities and/or limitations of the satellite.

In another example, a satellite access network is disclosed. The SAN may include means for selecting a reference location for a UT within a footprint of a satellite of a satellite communication system, means for determining a set of operating parameters for the RL communications to achieve a target power efficiency of the satellite based on the reference location for the UT, and means for dynamically adjusting one or more of the operating parameters, while maintaining the target power efficiency of the satellite, based at least in part on channel conditions in at least one of the service link, the feeder link, or a combination thereof. Among other advantages, the satellite access network disclosed herein may optimize RL communications between the UT and the SAN based on the capabilities and/or limitations of the satellite.

In another example, a non-transitory computer-readable medium is disclosed. The non-transitory computer-readable medium may store instructions that, when executed by one or more processors of a SAN, cause the SAN to perform operations that may include selecting a reference location for a UT within a footprint of a satellite of a satellite communication system, determining a set of operating parameters for the RL communications to achieve a target power efficiency of the satellite based on the reference location for the UT, and dynamically adjusting one or more of the operating parameters, while maintaining the target power efficiency of the satellite, based at least in part on channel conditions in at least one of the service link, the feeder link, or a combination thereof. Among other advantages, the non-transitory computer-readable medium disclosed herein may optimize RL communications between the UT and the SAN based on the capabilities and/or limitations of the satellite.

Other aspects of the disclosure are directed to apparatuses and methods for performing reverse link adaptation in a wireless communication system, wherein a Radio Frequency remote radio head (RRH) is configured to receive uplink (UL) communications from a user equipment (UE) via a service link and retransmit the UL communications to a base station or a cloud processing center via a wireless backhaul feeder link. In one example, a method of link adaptation is disclosed. The method may include selecting a reference location for the UE within a geographic coverage area of the RRH, determining a set of operating parameters for the UL communications to achieve a target power efficiency of the RRH based on the reference location for the UE, and dynamically adjusting the one or more operating parameters, while maintaining the target power efficiency of the RRH, based at least in part on channel conditions in at least one of the service link, the feeder link, or a combination thereof. Among other advantages, the method disclosed herein may optimize RL communications between the UT and the SAN based on the capabilities and/or limitations of the satellite.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
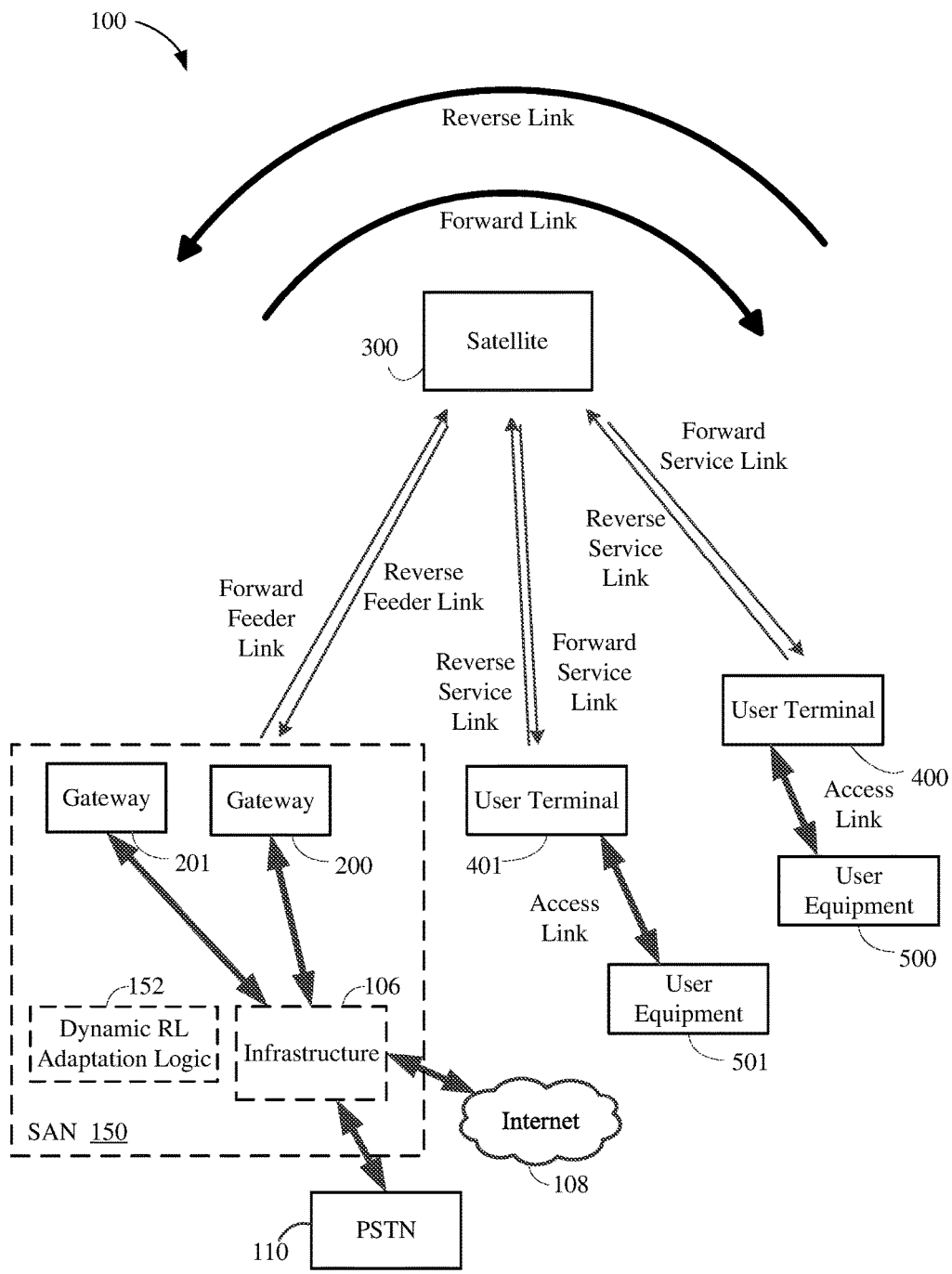
FIG. 1 shows a block diagram of an example communication system.

The example implementations described herein may mitigate the effects of rain fade, antenna beam pointing errors, line-of-sight blockage, Doppler effects, and/or other RF disturbances in a satellite communication system while maintaining efficient operation of a satellite acting as an RF intermediary between a user terminal (UT) and a satellite access network (SAN) of the satellite communication system. For example, as described in greater detail below, the SAN may first establish a set of reference operating parameters (such as a target signal-to-noise ratio, bandwidth allocation, and/or modulation and coding scheme) that optimizes reverse-link (RL) communications between the UT and the SAN based on the capabilities and/or limitations of the satellite. More specifically, the reference operating parameters may be used to achieve a target (e.g., optimal) power efficiency of the satellite under ideal channel conditions. The SAN may then dynamically adjust one or more of the operating parameters, while maintaining the target power efficiency of the satellite, to adapt to actual channel conditions in the service link (between the UT and the satellite) and/or feeder link (between the satellite and the SAN). As described in greater detail below, with respect to FIGS. 7-13, this method of link adaptation may compensate for RF disturbances in a particular communication link (such as the service link or the feeder link), independent of any RF disturbances that may be present in the other link.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite access network (SAN) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices.

In the example illustrated in FIG. 1, the UT 400 and the UE 500 communicate with each other via a bidirectional access link (having a forward access link and reverse access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The SAN 150 may include gateways 200 and 201, infrastructure 106, and additional elements or components (not shown for simplicity) for communicating with one or more user terminals 400 and/or 401 (e.g., via satellite 300) of the satellite communication system 100. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

The SAN 150 may include dynamic reverse-link (RL) adaptation logic 152 that may enable the SAN 150 to dynamically adjust one or more operating parameters for RL communications with a corresponding user terminal (e.g., UT 400) based on RF disturbances (such as rain fade) in at least one of the service link or the feeder link. More specifically, the dynamic RL adaptation logic 152 may allow the SAN 150 to adapt to changing channel conditions in the feeder link and/or the service link while maintaining a target power efficiency of the satellite 300, for example, as described in more detail below with respect to FIGS. 7-12. In some aspects, the SAN 150 may adjust a target signal-to-noise ratio (SNR) at which the RL communications are expected to be received at the SAN 150 to compensate for RF disturbances in the feeder link, independent of the channel conditions in the service link. In some other aspects, the SAN 150 may adjust a number of resource blocks (RBs) or a modulation and coding scheme (MCS) used by the UT to transmit the RL communications to compensate for RF disturbances in the service link, independent of the channel conditions in the feeder link.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a reverse link (which may also be referred to as a "return link"). As such, the signal path from the gateway 200 to the satellite 300 is labeled "Forward Feeder Link" whereas the signal path from the satellite 300 to the gateway 200 is labeled "Reverse Feeder Link" in FIG. 1. In a similar manner, the signal path from each UT 400 or 401 to the satellite 300 is labeled "Reverse Service Link" whereas the signal path from the satellite 300 to each UT 400 or 401 is labeled "Forward Service Link" in FIG. 1.

Figure 2:
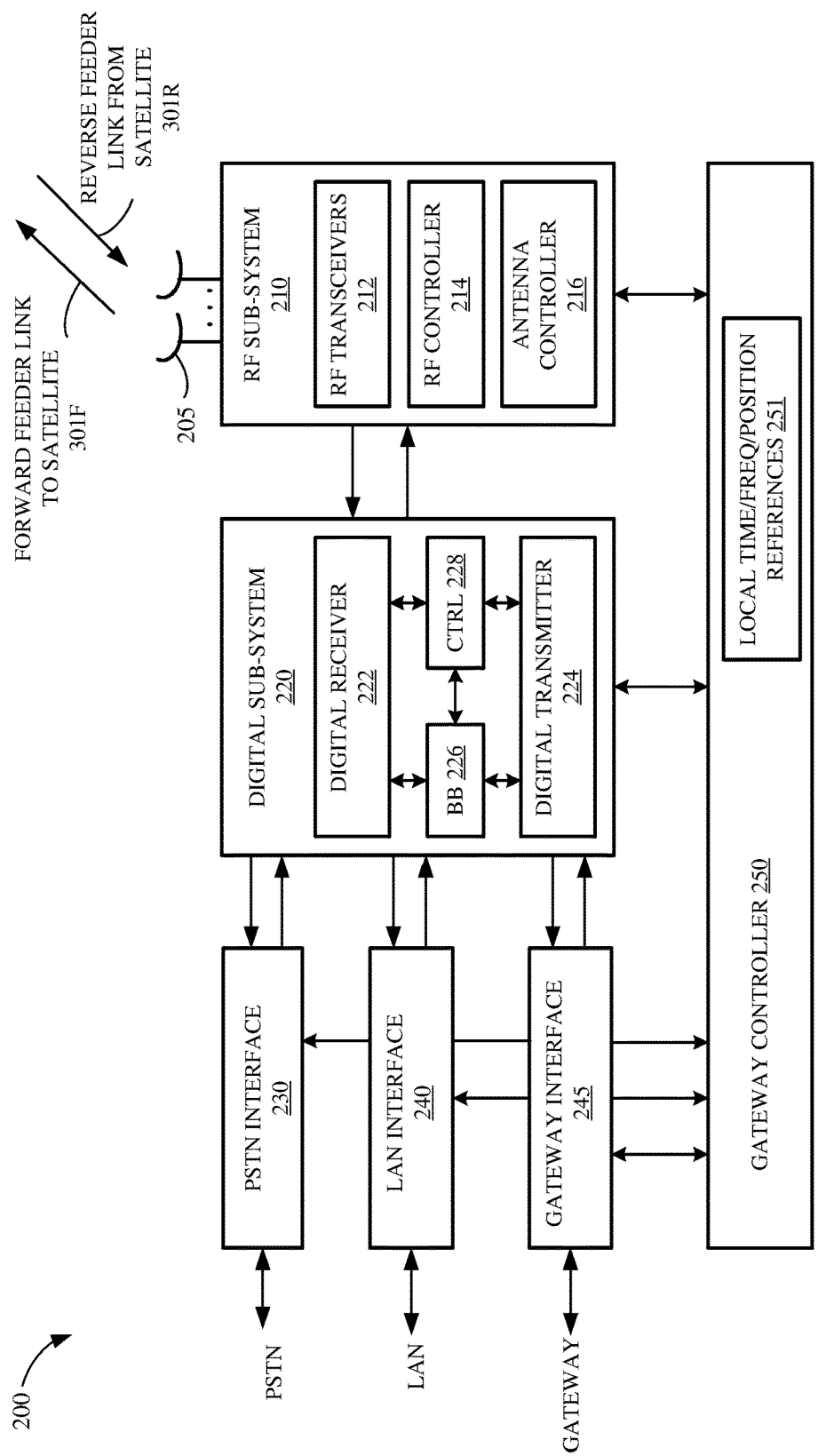
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a reverse feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, estimate delays between the satellite 300 and the SAN 150, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
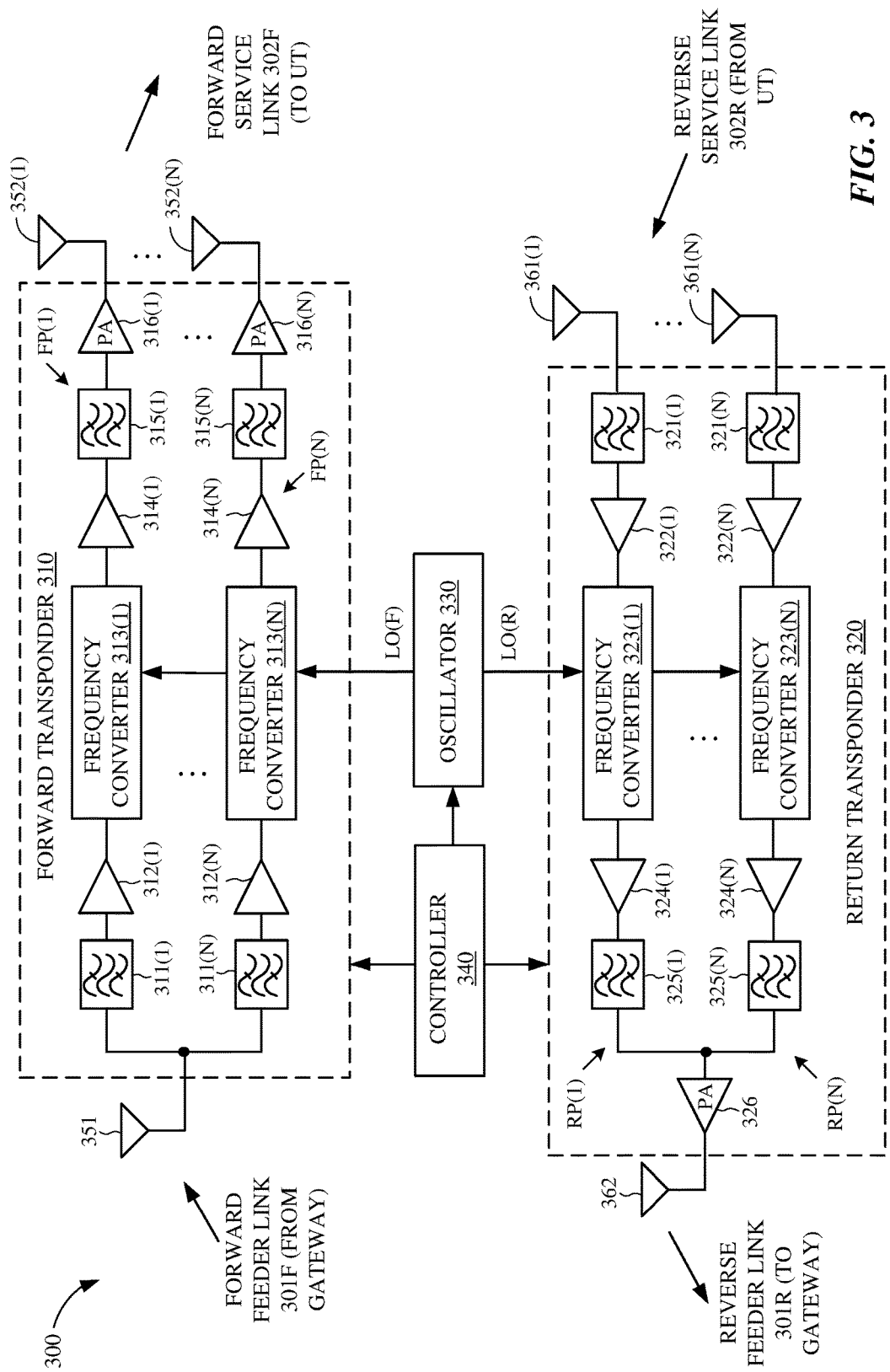
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 along forward service link 302F via respective antenna 352. The return transponder 320, which includes a number N of return paths RP(1)-RP(N), receives communication signals from UT 400 along reverse service link 302R via antennas 361(1)-361(N), and transmits communication signals to gateway 200 along reverse feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
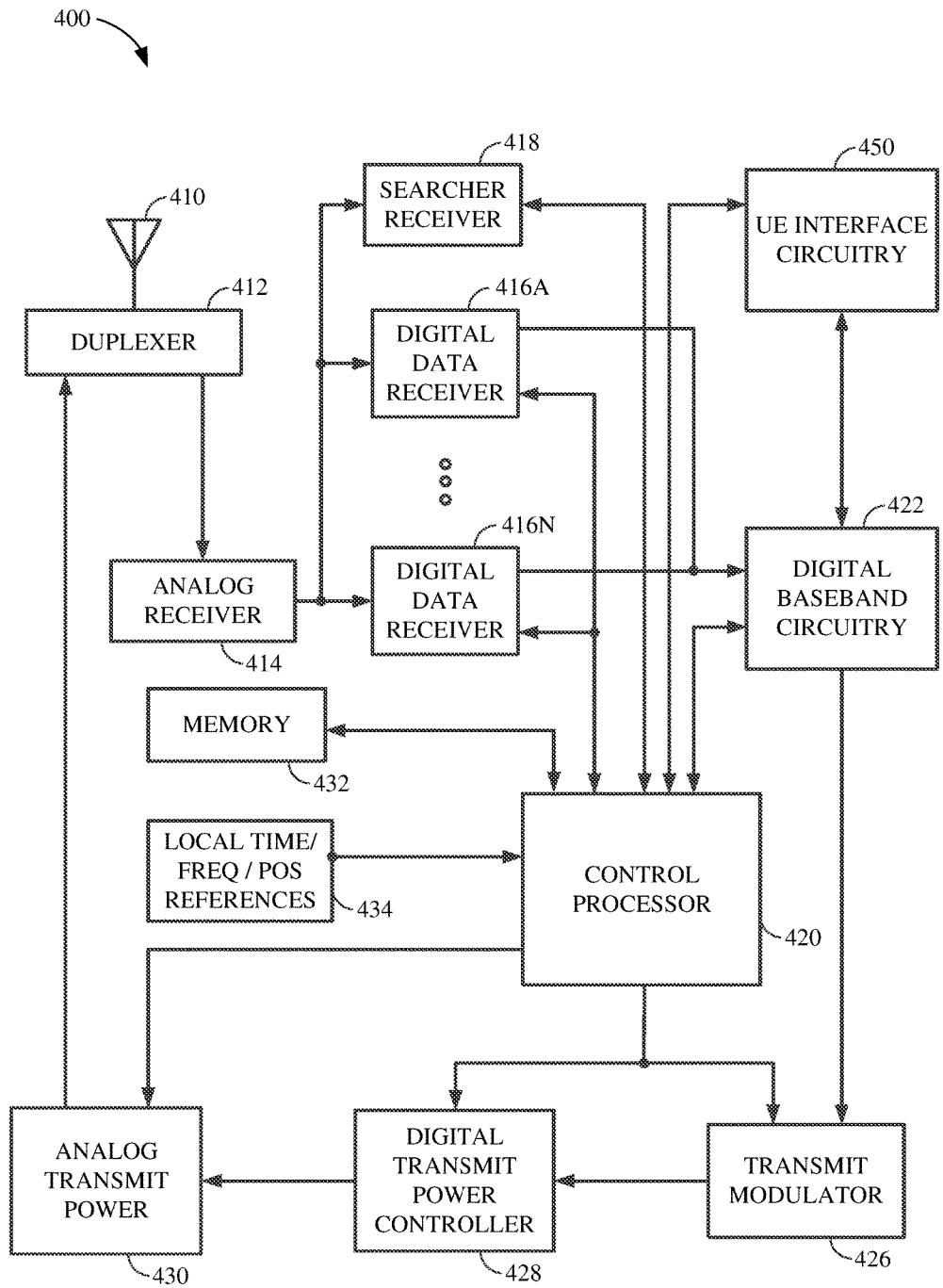
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN)

interface and/or other known communication technologies configured to communicate with one or more UEs in communication with UT 400.

Figure 5:
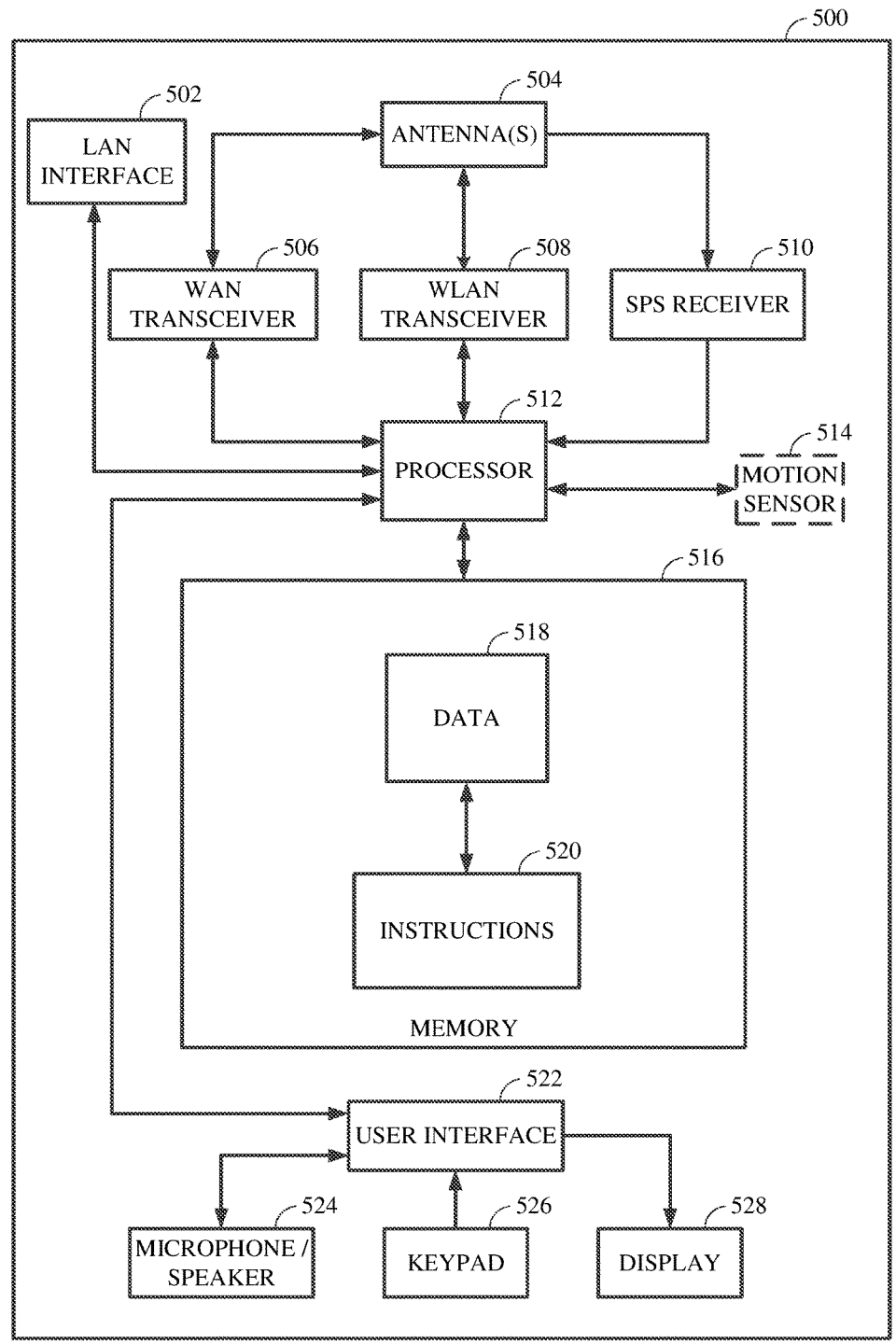
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device (e.g., wireless node, small cell, etc.) that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510.

Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
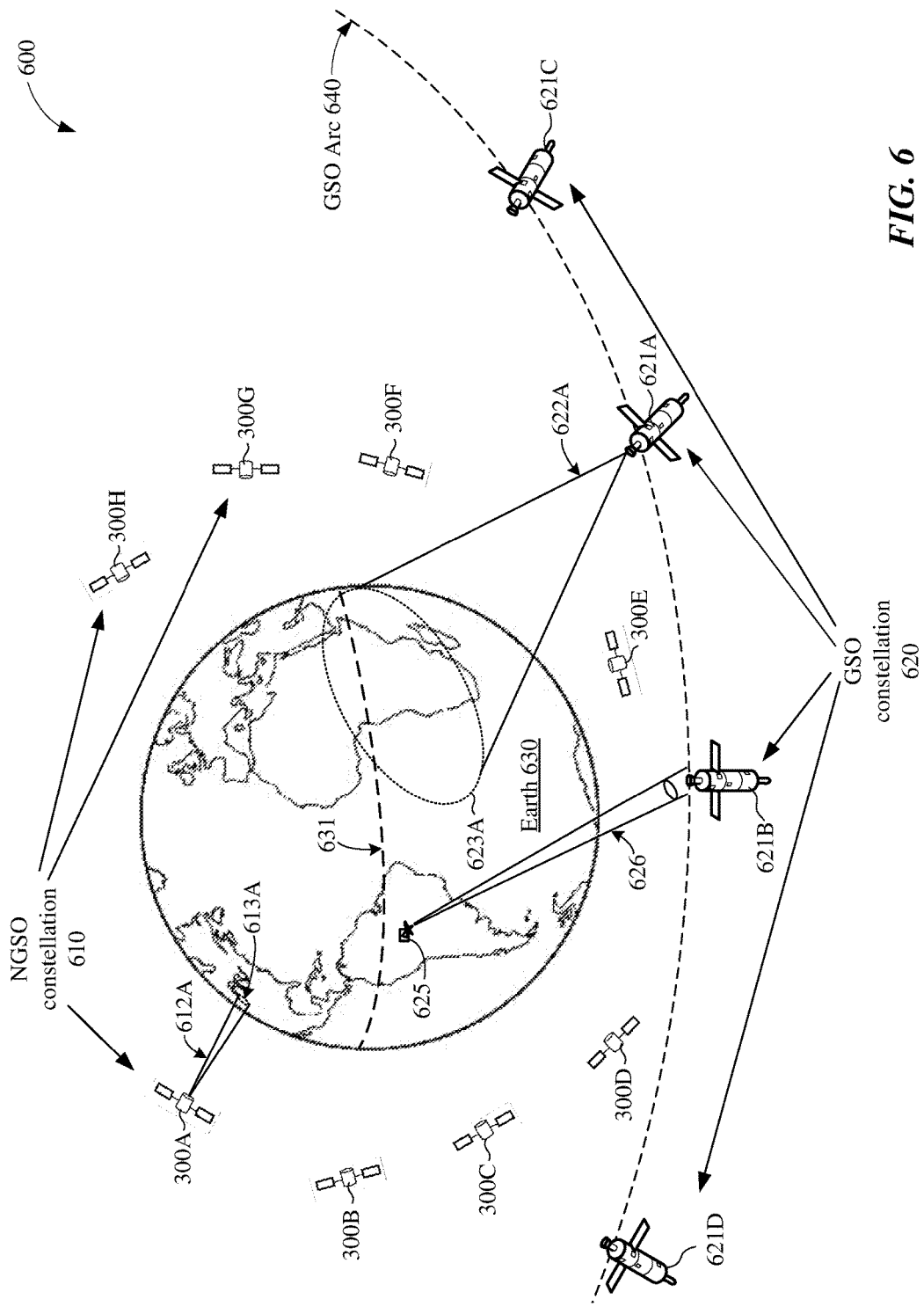
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

Figure 7:
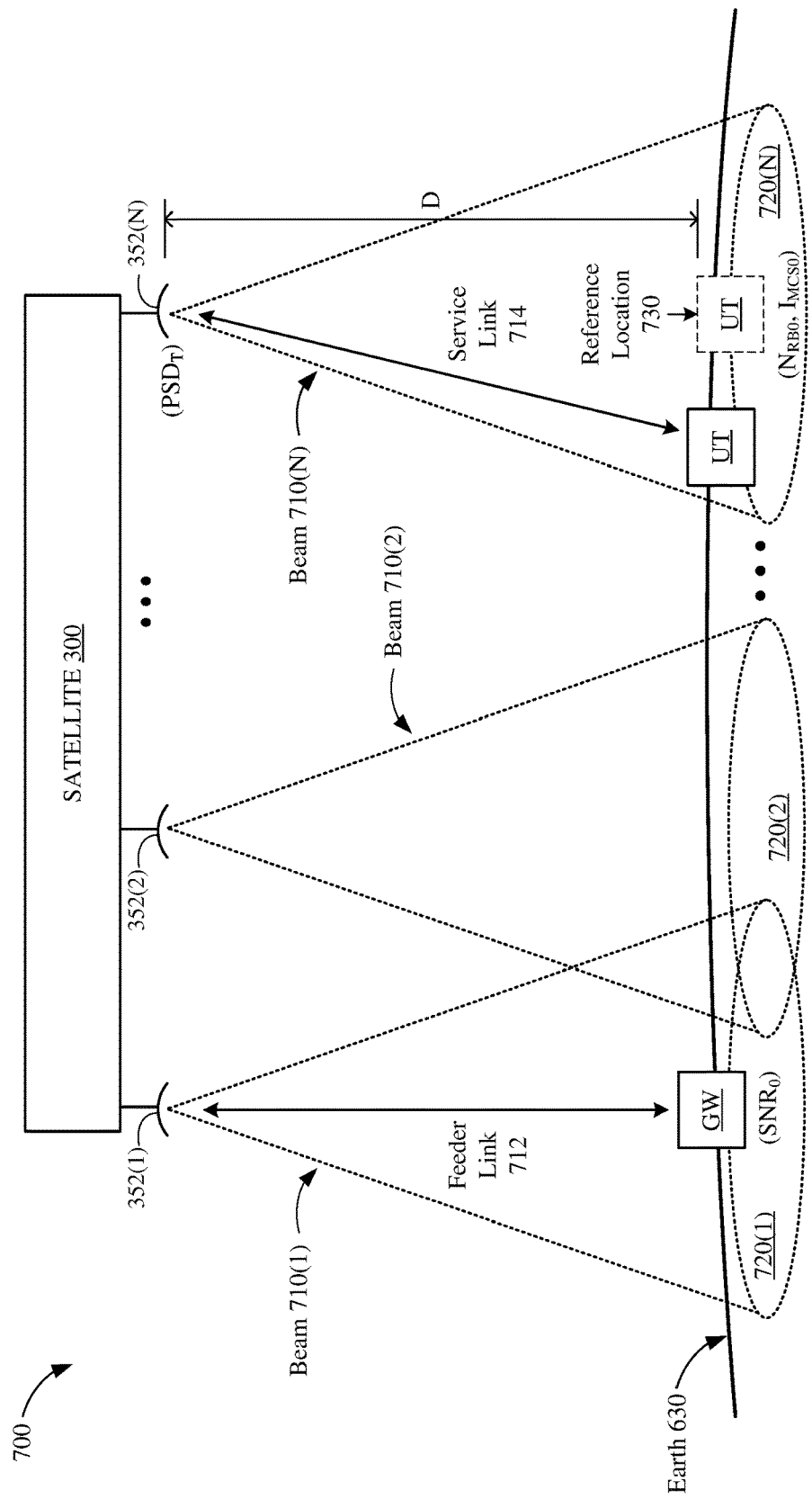
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding return path (RP) in the return transponder 320 of satellite 300. Each of the beams 710(1)-710(N) may be used to transmit data between a gateway (GW) and a user terminal (UT) that are located within the beam's coverage area on Earth 630. For example, the GW may be an implementation of the gateway 200 of FIG. 2 and the UT may be an implementation of the user terminal 400 of FIG. 4. In some implementations, the GW may be included in, or form at least part of, a satellite access network (such as SAN 150 of FIG. 1). The satellite 300 may function as an RF intermediary for communications between the GW and the UT. Thus, the GW may communicate with the satellite 300 via a feeder link 712, and the UT may communicate with the satellite 300 via a service link 714.

For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300. Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. Adjacent pairs of the coverage areas 720(1)-720(N) may touch and/or overlap each other, for example, so that the footprint provided by the beams 710(1)-710(N) may have minimal coverage gaps. Although the GW is depicted as residing within the coverage area 720(1) of beam 710(1) (for simplicity), the GW may communicate (e.g., via any of the beams 710(1)-710(N) of the satellite 300) with user terminals in any of the beam coverage areas 720(1)-720(N).

The satellite may 300 may be configured to receive forward-link (FL) communications from the GW (via the feeder link 712) and retransmit the FL communications to the UT (via the service link 714). Similarly, the satellite 300 may also be configured to receive reverse-link (RL) from the UT (via the service link 714) and retransmit the RL communications to the GW (via the feeder link 712). In some implementations, the satellite 300 may be configured to perform frequency conversion and power amplification when retransmitting communication signals to an intended recipient. For example, the satellite 300 may include one or more power amplifiers configured to amplify the received signals so that the retransmitted signals are at a sufficiently high power level to be detected by the receiving device. Because a power amplifier also consumes power during the amplification process, the efficiency of the power amplifier (e.g., ratio of output power relative to input power) may vary with respect to the amount of power in the received signal.

For example, the efficiency curve of a power amplifier may include a "linear region" and a "saturation region." In the linear region, the power level of the retransmitted signal may grow linearly with respect to the power level of the received signal, until the power amplifier reaches a saturation point. The saturation point may describe an operation point of the power amplifier at which the power efficiency tapers off significantly. Thus, in the saturation region (e.g., past the saturation point), the retransmitted signal may experience little (or no) increase in power level relative to further increases in the power level of the received signal. Thus, the power amplifier operates much more efficiently in the linear region than the saturation region. Optimal efficiency may be achieved when operating the power amplifier at, or just before, the saturation point.

Aspects of the present disclosure may ensure that communication signals received at the satellite 300 have sufficient power to operate the power amplifier of the satellite 300 at a target power efficiency. The target power efficiency may correspond to an operating point in the linear region of the satellite's power efficiency curve. The operating point of the power amplifier is defined by the power spectral density (PSD) of the communications signals arriving at the satellite 300. Resource scheduling and power control decisions for a satellite communication system are typically managed by the SAN (not shown for simplicity). As described above, the SAN is located proximate to the GW, and thus remotely from the UT. However, it may be desirable to manage the transmit power of the UT to close the link between the UT and the satellite 300, and to close the link between the satellite 300 and the GW. Thus, the implementations described herein may allow the SAN to determine a set of operating parameters for reverse-link (RL) communications, initiated by the UT, that allow the satellite 300 to achieve the target power efficiency. Further, aspects of the present disclosure may enable the SAN to dynamically adjust one or more of the operating parameters, while maintaining the target power efficiency of the satellite 300, to adapt to channel conditions in at least one of the feeder link 712 or the service link 714.

In some implementations, the SAN may determine a set of reference operating parameters for RL communications at which the satellite may achieve the target power efficiency.

In some aspects, one or more operating parameters may include a target signal-to-noise ratio (SNR) for the RL communications to be received at the GW (or SAN), a bandwidth allocation for the RL communications, or a modulating and coding scheme (MCS) implemented by the UT for transmitting the RL communications. The reference operating parameters may reflect an optimal configuration for each of the one or more operating parameters under ideal channel conditions (e.g., assuming no RF disturbances in the feeder link 712 or the service link 714). For example, the reference operating parameters may assume that the UT transmits RL communications at its maximum transmit power using all available bandwidth (e.g., per component carrier) in the service link 714, and that the GW (or SAN) receives the RL communications at the highest achievable SNR (e.g., when the satellite 300 operates at a target power efficiency).

To determine the set of reference operating parameters, the SAN may first select a reference location 730 for the UT within the footprint of the satellite 300. The reference location 730 may correspond to a location at which the UT is able to transmit RL communications to the satellite 300 at maximum power using all of the bandwidth available to the UT. In some aspects, the reference location 730 may correspond to a location at which a distance (D) between the UT and the satellite 300 is shortest compared to other locations within the footprint of the satellite. For example, the reference location 730 may coincide with the center of the beam coverage area 720(N) in which the UT is located. It is noted that the reference location 730 may differ from the actual location of the UT at any given time (e.g., as shown in FIG. 7).

In some implementations, the SAN may determine a target PSD ($PSD_T$) at which the satellite 300 should receive RL communications from the UT (e.g., to operate at the target power efficiency) based on the reference location 730 of the UT. As described above, the PSD of communications signals arriving at the satellite 300 defines the operation point of the satellite's power amplifier. In some aspects, the target PSD may correspond to a PSD needed to operate the satellite 300 at its optimal power efficiency (e.g., in the linear region at, or just before, the saturation point). Thus, the SAN may determine, based on the reference location 730 for the UT, a number of resource blocks (RBs) that can be allocated to the UT to achieve the target PSD when the UT transmits RL signals at its maximum transmit power. The number of RBs that can be allocated to the UT, based on the reference location 730, may hereinafter be referred to as a "reference" number of RBs ($N_{RB0}$). In some other aspects, the target PSD may correspond to the PSD of RL signals received at the satellite 300 when the UT transmits the RL signals, from the reference location 730, at its maximum transmit power using all available bandwidth (e.g., per component carrier) in the service link 714. Accordingly, the reference number of RBs may correspond to the maximum number of RBs allocable to the UT.

In some implementations, the SAN may also determine a reference SNR ($SNR_0$) at which RL communications can be received at the GW (or SAN) based, at least in part, on the reference location 730 of the UT. For example, the reference SNR may correspond to the SNR of RL signals received at the GW when the UT transmits the RL signals, from the reference location 730, at its maximum transmit power using the reference number of RBs (e.g., to achieve the target PSD at the satellite 300). Thus, in some aspects, the reference SNR may represent the highest-achievable SNR at which RL communications can be received at the GW (or SAN) while maintaining a target power efficiency of the satellite 300.

In some implementations, the SAN may determine a reference MCS index ($I_{MCS0}$) that can be implemented, by the UT, for transmitting RL communications from the reference location 730. For example, the reference MCS index may correspond to the maximum MCS index that the UT may use to transmit RL communications, when transmitting at maximum power from the reference location 730, while maintaining at least a threshold block error rate (BLER). More specifically, the reference MCS index may be a function of the reference number of RBs allocated for RL communications and the reference SNR at which the RL communications are expected to be received by the GW (e.g., $I_{MCS0}=f(BLER(N_{RB0}, SNR_0))$). Thus, in some aspects, the reference MCS index may represent the highest MCS index that can be supported by a target power efficiency of the satellite 300.

As described above, the reference operating parameters $SNR_0$, $N_{RB0}$, and $I_{MCS0}$ may represent an optimal configuration for RL communications between the UT and the GW (or SAN) under ideal channel conditions. Thus, the target power efficiency for the satellite 300 may correspond with the PSD (e.g., the target PSD) at which RL communications are received by the satellite 300 under the set of reference operating parameters. In actual implementations, the SAN may dynamically adjust one or more of the operating parameters based on actual channel conditions in the feeder link 712 and/or the service link 714. For example, RF disturbances in the feeder link 712 and/or service link 714 may cause signal attenuation in communications between the satellite 300 and the GW and/or UT, respectively. In some implementations, the SAN may adjust one or more of the operating parameters (e.g., from their optimal configuration) to mitigate and/or compensate for RF disturbances in the satellite communication system while maintaining the target power efficiency of the satellite 300.

Figure 8A:
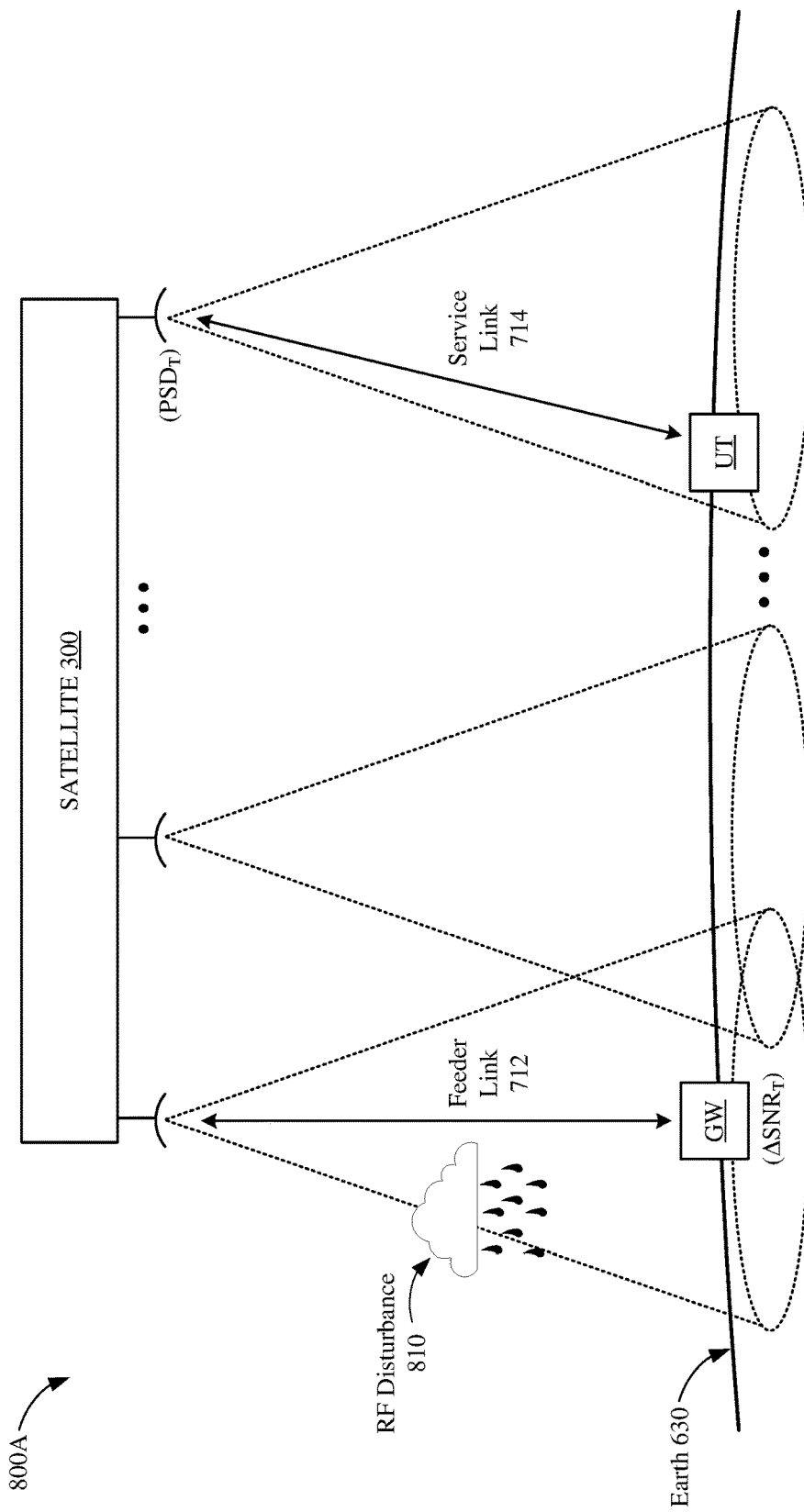
FIG. 8A shows an example satellite communication system with RF disturbance in a feeder link.

FIG. 8A shows an example satellite communication system 800A with RF disturbance in a feeder link. The satellite communication system 800A may be substantially similar to the satellite communication system depicted in FIG. 7. For example, the GW may be an implementation of the gateway 200 of FIG. 2 and the UT may be an implementation of the user terminal 400 of FIG. 4. In some implementations, the GW may be included in, or form at least part of, a satellite access network (such as SAN 150 of FIG. 1). In the example of FIG. 8A, one or more RF disturbances 810 in the feeder link 712 may cause signal attenuation in communications between the satellite 300 and the GW (or SAN). Example RF disturbances 810 may be attributed (but not limited) to rain fade, antenna beam pointing errors, line-of-sight blockage, and/or Doppler effects.

The RF disturbances 810 in the feeder link 712 may reduce the SNR of RL communication signals arriving at the GW. In some aspects, the GW may expect to receive RL communication signals at a "target" SNR ($SNR_T$). For example, the GW (or SAN) may process incoming communication signals only with an SNR at, or above, the target SNR. Signals arriving at the GW with an SNR below the target SNR may be ignored and/or filtered (e.g., as noise or interference) by the receiver circuitry in the GW. Conventional methods of link adaptation may compensate for signal attenuation (e.g., caused by the RF disturbances 810) by increasing the transmit power of the RL communication signals at the UT. However, merely increasing the transmit power at the UT may cause the PSD of the RL communication signals, received at the satellite 300, to increase beyond the target PSD. This may push the operating point of the power amplifier in the satellite 300 beyond the target power efficiency.

In some implementations, the SAN may compensate for RF disturbances 810 in the feeder link 712 while maintaining the target power efficiency of the satellite 300. More specifically, the SAN may adjust one or more operating parameters for RL communications between the UT and the GW (or SAN) to compensate for the RF disturbances 810 in the feeder link 712, independent of the channel conditions in the service link 714. In some aspects, the SAN may compensate for the RF disturbances 810 by reducing the target SNR at which RL communications are expected to be received at the GW (or SAN). For example, the SAN may estimate the amount of change in SNR ($\Delta SNR_{FADE}$) caused by the RF disturbances 810 based on feeder link fade estimates (e.g., for the feeder link 712). The SAN may then reduce the target SNR at the GW by subtracting the change in SNR, attributed to the RF disturbances 810, from the reference SNR (e.g., $\Delta SNR_T = SNR_0 - \Delta SNR_{FADE}$). By reducing the target SNR at the GW (or SAN), the SAN may ensure that the GW is able to continue receiving RL communication signals without causing the UT to increase the transmission power of the RL communication signals.

In some aspects, the SAN may adjust the MCS index used for RL communications based, at least in part, on changes to the target SNR. For example, the SAN may select the highest MCS index that can be used for the RL communications to achieve at least a threshold BLER while maintaining the target SNR at the GW (or SAN). As described above, the MCS index may be a function of the number of RBs allocated for RL communications and the target SNR at which the RL communications are expected to be received by the GW (e.g., $I_{MCS} = f(BLER(N_{RB}, SNR_T))$). In some implementations, the number of RBs allocated for RL communications may be determined based on the presence, or absence, of RF disturbances in the service link 714 (e.g., as described below with respect to FIG. 8B). However, it may be desirable to compensate for RF disturbances 810 in the feeder link 712 independent of the channel conditions in the service link 714. Thus, the SAN may refrain from adjusting operating parameters that may affect the transmit power of RL communications in the service link 714 (such as the number of RBs allocated for the RL communications) when compensating for RF disturbances 810 in the feeder link 712.

In some implementations, the SAN may periodically adjust the one or more operating parameters in response to changing channel conditions in the feeder link 712. For example, the SAN may reduce the target SNR at which RL communications are to be received at the GW when the RF disturbances 810 are present in the feeder link 712. Furthermore, the SAN may increase the target SNR at which RL communications are to be received at the GW (e.g., up to $SNR_0$) when the RF disturbances 810 lessen or are no longer present. In some aspects, the SAN may dynamically adjust the target SNR at the GW per transmission time interval (TTI).

Figure 8B:
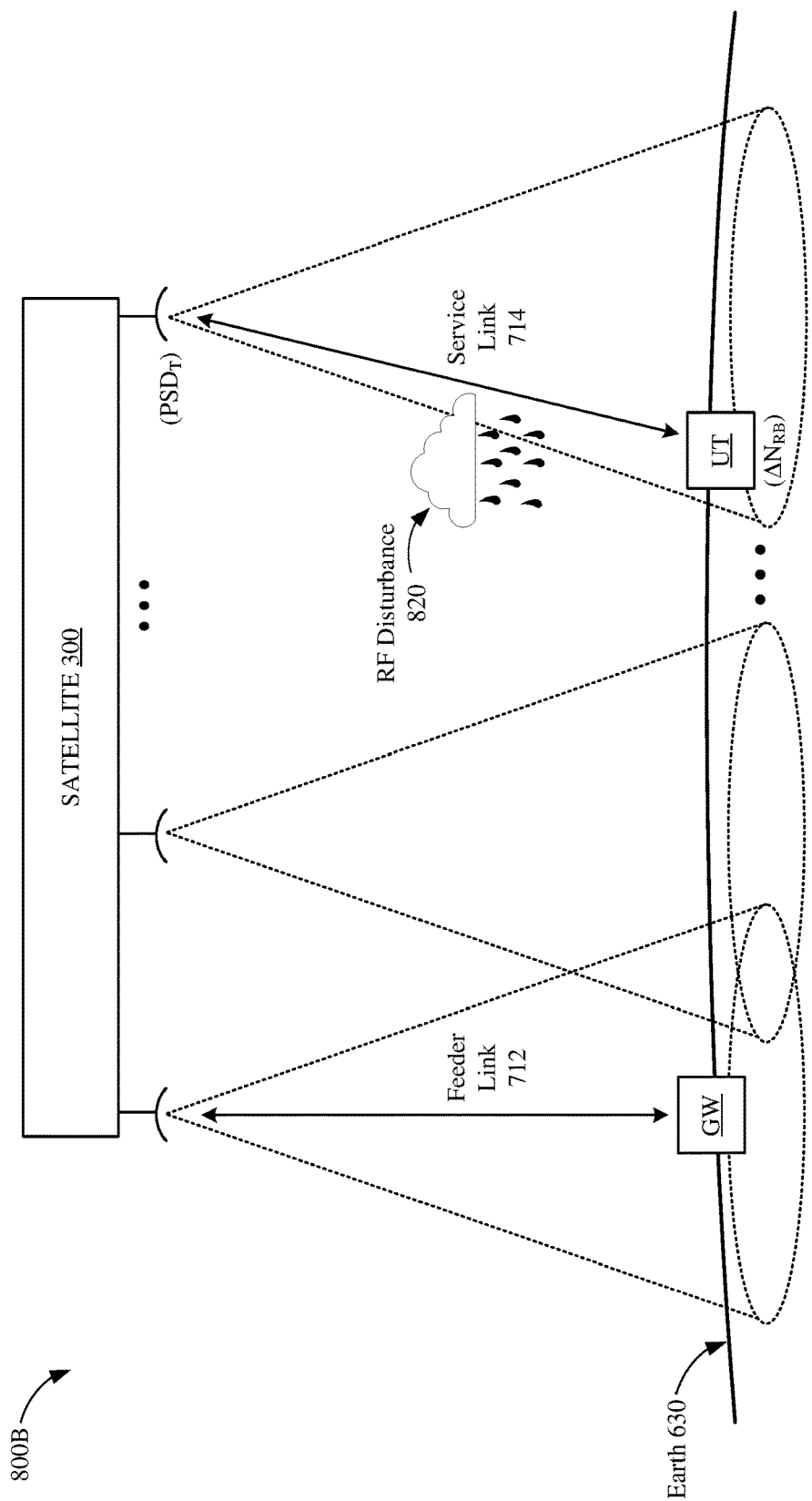
FIG. 8B shows an example satellite communication system with RF disturbance in a service link.

FIG. 8B shows an example satellite communication system 800B with RF disturbance in a service link. The satellite communication system 800B may be substantially similar to the satellite communication system depicted in FIG. 7. For example, the GW may be an implementation of the gateway 200 of FIG. 2 and the UT may be an implementation of the user terminal 400 of FIG. 4. In some implementations, the GW may be included in, or form at least part of, a satellite access network (such as SAN 150 of FIG. 1). In the example of FIG. 8B, one or more RF disturbances 820 in the service link 714 may cause signal attenuation in communications between the satellite 300 and the UT. Example RF 820 disturbances may be attributed (but not limited) to rain fade, antenna beam pointing errors, line-of-sight blockage, and/or Doppler effects.

The RF disturbances 820 in the service link 714 may reduce the PSD of RL communication signals arriving at the satellite 300. As described above, the satellite 300 may be configured to receive RL communication signals at a target PSD (PSDT). For example, the target PSD may correspond with a target power efficiency for the satellite's power amplifier. Signals arriving at the satellite 300 with a PSD below the target PSD may prevent the satellite 300 from operating at the target power efficiency. As a result, RL communications received by the satellite 300 may be retransmitted with less power, and may thus arrive at the GW with an SNR below the target SNR of the GW. RL communication signals arriving at the GW below the target SNR may result in higher reverse link BLER performance and unnecessary hybrid automatic repeat request (HARQ) retransmissions.

In some implementations, the SAN may compensate for RF disturbances 820 in the service link 714 while maintaining the target power efficiency of the satellite 300. More specifically, the SAN may adjust one or more operating parameters for RL communications between the UT and the GW (or SAN) to compensate for the RF disturbances 820 in the service link 714, independent of the channel conditions in the feeder link 712. In some aspects, the SAN may compensate for the RF disturbances 820 by reducing the number of RBs allocated for the RL communications such that the amount of power per RB received at the satellite 300 is within an expected optimum range. For example, the SAN may determine a power budget of the UT based on power headroom reports (PHRs) received from the UT. Each PHR may indicate an availability (or deficit) of transmit power at the UT based on an existing bandwidth allocation (e.g., from a previous TTI). The SAN may then determine, based on the amount of available transmit power in the UT, the maximum number of RBs that can be allocated for RL communications to maintain the target PSD (e.g., per RB) at the satellite 300.

For example, the maximum number of RBs ($MaxN_{RB}$) allocable to the UT at an $i^{th}$ instant of time may be determined based on a PHR sent at a $\tau^{th}$ instant of time, according to the following equation:

$$MaxN_{RB}(i) = \left[ N_{RB}(\tau) * 10^{\frac{PHR(\tau) - (\Delta_{TF}(i) - \Delta_{TF}(\tau)) - \Sigma_{k \in [\tau, i]} f(k)}{10}} \right]$$

where $NRB(\tau)$ is the number of resource blocks allocated to the UT at the $\tau^{th}$ instant of time, $PHR(\tau)$ represents the amount of available transmit power in the UT at the $\tau^{th}$ instant of time, $\Delta_{TF}(i) - \Delta_{TF}(\tau)$ reflects a change in the power adjustment parameter from the $\tau^{th}$ instant of time to the $i^{th}$ instant of time, and $\Sigma_{k \in [\tau, i]} f(k)$ represents the accumulated path loss adjustments of the RL communication signals during that interval.

Distributing the transmit power of the UT over a smaller number of RBs may increase the PSD (per RB) of RL communications. However, reducing the number of RBs (e.g., beyond a threshold amount) may cause a degradation in performance of RL communications due to reduced channel coding gain. Thus, in some implementations, the SAN may determine a threshold number of RBs ($N_{RB\_TH}$) to be allocated to the UT. The threshold number of RBs may be established such that, using fewer than the threshold number of RBs may result in unacceptable performance degradation in RL communications. Thus, if the maximum number of RBs currently allocable to the UT is greater than or equal to the threshold number of RBs ($MaxN_{RB}(i) \geq N_{RB\_TH}$), the SAN may allocate the maximum number of RBs to the UT for subsequent RL communications (e.g., $N_{RB} = MaxN_{RB}(i)$). However, if the maximum number of RBs currently allocable to the UT is less than the threshold number of RBs ($MaxN_{RB}(i) < N_{RB\_TH}$), the SAN may allocate the threshold number of RBs to the UT for subsequent RL communications (e.g., $N_{RB} = N_{RB\_TH}$).

In some implementations, the SAN may adjust the MCS index used for the RL communications when the maximum number of RBs currently allocable to the UT is less than the threshold number of RBs. For example, when the threshold number of RBs is greater than the maximum number of RBs currently allocable to the UT, allocating the threshold number of RBs to the UT may reduce the PSD at which RL communications are received at the satellite 300 under the existing modulation and coding scheme. Thus, the SAN may select a lower MCS in order to maintain the target PSD at the satellite 300 when the UT transmits RL communications via the threshold number of RBs. In some aspects, the SAN may directly "downgrade" the MCS index from the MCS index previously used for RL communications. For example, based on the highest MCS index at the $\tau^{th}$ instant of time, the SAN may select the next-highest MCS index to be used for the $i^{th}$ instant of time (e.g., $I_{MCS}(i) = I_{MCS}(\tau) - 1$). In some other aspects, the SAN may determine the MCS index to be used for subsequent RL communications based on the information provided in the PHR.

For example, the SAN may first calculate the current power adjustment parameter ($\Delta_{TF}(i)$) based on the PHR sent at the $\tau^{th}$ instant of time, according to the following equation:

$$\Delta_{TF}(i) = \Delta_{TF}(\tau) + PHR(\tau) - 10\log\left(\frac{N_{RB\_TH}}{N_{RB}(\tau)}\right) - \sum_{k\in[\tau,i]} f(k)$$

where $\Delta_{TF}(\tau)$ is the power adjustment parameter at the $\tau^{th}$ instant of time, $PHR(\tau)$ represents the amount of available transmit power in the UT at the $\tau^{th}$ instant of time, $NRB(\tau)$ is the number of resource blocks allocated to the UT at the $\tau^{th}$ instant of time, and $\sum_{k\in[\tau,i]} f(k)$ represents the path loss adjustments of the RL communication signals since PHR was transmitted. The SAN may then select the MCS index to be used for the $i^{th}$ instant of time as a function of the power adjustment parameter (e.g., $I_{MCS}(i) = g(\Delta_{TF}(i))$).

Still further, in some implementations, the SAN may adjust the target SNR at which RL communications are expected to be received at the GW (or SAN) when the maximum number of RBs currently allocable to the UT is less than the threshold number of RBs. For example, the SAN may reduce the target SNR in order to maintain the threshold BLER (e.g., for RL communications received at the GW) when the UT transmits the RL communications using the new MCS index and the threshold number of RBs. More specifically, a "new" target SNR may be determined as a function of the threshold number of resource blocks and the new MCS index (e.g., $SNR_T(i) = f(BLER, N_{RB\_TH}, I_{MCS}(i))$). It is noted that this new target SNR reflects the RF disturbances 820 in the service link 714. In some aspects, this new target SNR may override or replace the target SNR determined based on RF disturbances 810 in the feeder link 712 (e.g., as described with respect to FIG. 8A).

In some implementations, the SAN may periodically adjust the one or more operating parameters in response to changing channel conditions in the service link 714. For example, the SAN may reduce the number of RBs allocated to the UT (e.g., for RL communications) when the RF disturbances 820 are present in the service link 714. Furthermore, the SAN may increase the number of RBs allocated to the UT (e.g., up to $N_{RB0}$) when the RF disturbances 820 lessen or are no longer present. In some aspects, the SAN may dynamically adjust the number of RBs allocated to the UT per TTI.

Figure 8C:
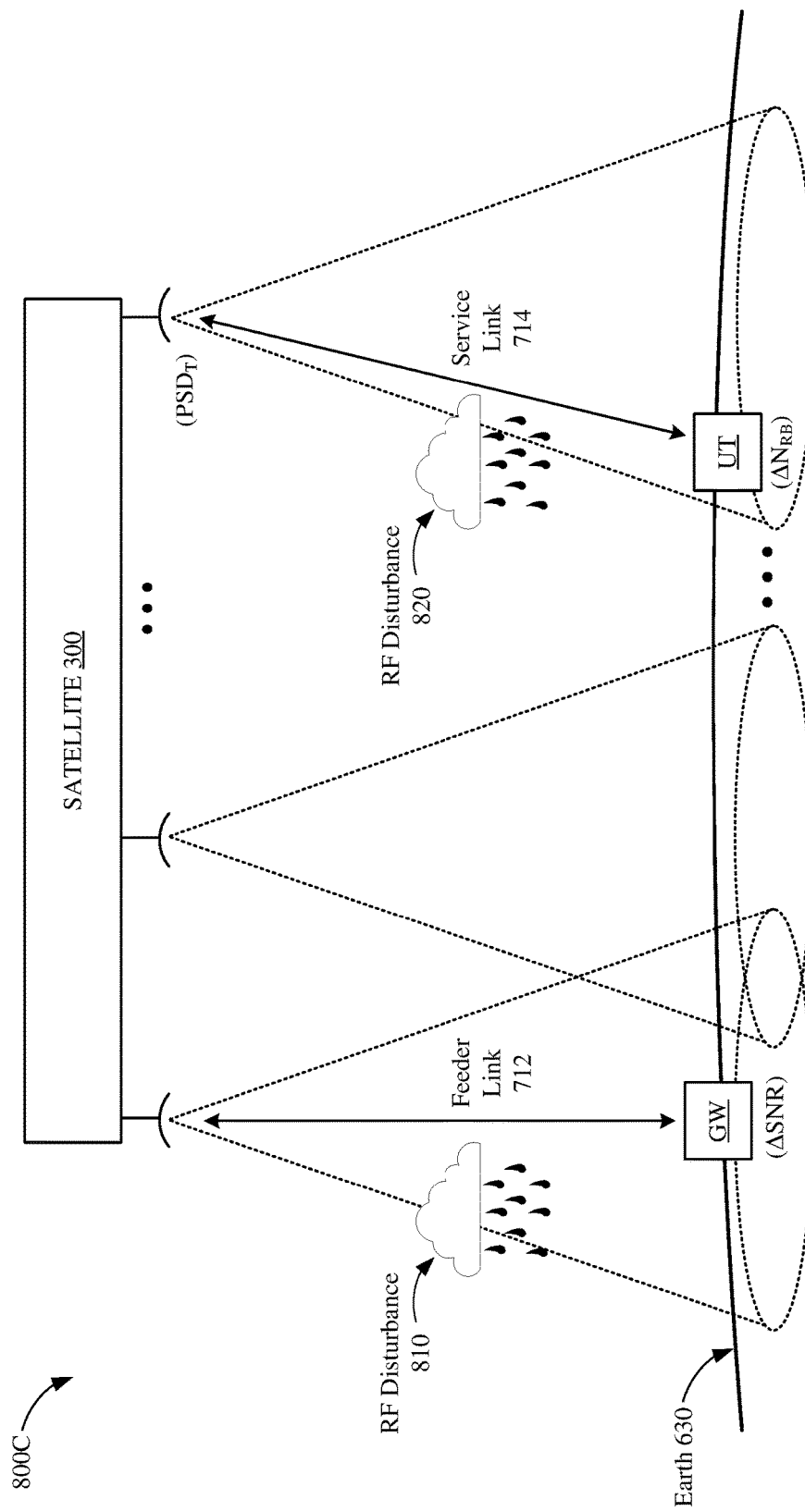
FIG. 8C shows an example satellite communication system with RF disturbances in the feeder link and the service link.

FIG. 8C shows an example satellite communication system 800C with RF disturbances in the feeder link and the service link. The satellite communication system 800C may be substantially similar to the satellite communication system depicted in FIG. 7. For example, the GW may be an implementation of the gateway 200 of FIG. 2 and the UT may be an implementation of the user terminal 400 of FIG. 4. In some implementations, the GW may be included in, or form at least part of, a satellite access network (such as SAN 150 of FIG. 1). In the example of FIG. 8C, one or more RF disturbances 810 in the feeder link 712 may cause signal attenuation in communications between the satellite 300 and the GW (or SAN), and one or more RF disturbances 820 in the service link 714 may cause signal attenuation in communications between the satellite 300 and the UT. Example RF disturbances 810 and 820 may be attributed (but not limited) to rain fade, antenna beam pointing errors, line-of-sight blockage, and/or Doppler effects.

As described above, the RF disturbances 810 in the feeder link 712 may reduce the SNR of RL communications arriving at the GW, and the RF disturbances 820 in the service link 714 may reduce the PSD of RL communications arriving at the satellite 300. In some implementations, the SAN may compensate for the RF disturbances 810 in the feeder link 712 while maintaining the target power efficiency of the satellite 300. Similarly, the SAN may compensate for the RF disturbances 820 in the service link 714 while also maintaining the target power efficiency of the satellite 300. By using the target power efficiency of the satellite 300 as a common reference point, the SAN may compensate for RF disturbances in each of the communication links 712 and 714, independently. For example, the SAN may ignore the RF disturbances 820 in the service link 714 when compensating for RF disturbances 810 in the feeder link 712. Similarly, the SAN may ignore the RF disturbances 810 in the feeder link 712 when compensating for RF disturbances 820 in the service link 714.

In some implementations, the SAN may compensate for the RF disturbances 810 in the feeder link 712 by reducing the target SNR at which RL communications are expected to be received at the GW (such as described with respect to FIG. 8A). By reducing the target SNR at the GW, the SAN may ensure that the GW is able to continue receiving RL communication signals (e.g., when the satellite 300 operates at its target power efficiency) with RF disturbances 810 present in the feeder link 712. In some aspects, the SAN may adjust the MCS index used for RL communications based, at least in part, on changes to the target SNR at the GW. For example, the SAN may select the highest MCS index that can be used for the RL communications to achieve at least a threshold BLER while maintaining the target SNR at the GW. However, it is noted that the SAN may refrain from adjusting operating parameters that may affect the transmit power of RL communications in the service link 714 (such as the number of RBs allocated to the UT) when compensating for RF disturbances 810 in the feeder link 714.

In some implementations, the SAN may compensate for the RF disturbances 820 in the service link 714 by reducing the number of RBs allocated to the UT for RL communications (such as described with respect to FIG. 8B). By reducing the number of RBs allocated to the UT, the SAN may ensure that the satellite 300 is able to continue receiving RL communications at the target PSD (e.g., corresponding to the satellite's target power efficiency) with RF disturbances 820 present in the service link 714. In some aspects, the SAN may adjust the MCS index used for RL communications based, at least in part, on changes to the number of RBs allocated to the UT. For example, the SAN may select a lower MCS index if the maximum number of RBs allocable to the UT (e.g., to achieve the target PSD) is less than a threshold number of RBs needed to maintain a desired level of performance (e.g., due to reduced channel coding gain). Still further, in some aspects, the SAN may adjust the target SNR at which RL communications are expected to be received at the GW when the maximum number of RBs allocable to the UT is less than the threshold number of RBs. For example, the SAN may reduce the target SNR in order to maintain the threshold BLER, for RL communications received at the GW, when the UT implements the new MCS index. This new target SNR may override or replace the target SNR determined based on the RF disturbances 810 in the feeder link 712 (e.g., described above).

In some implementations, the SAN may periodically adjust the one or more operating parameters in response to changing channel conditions in the feeder link 712 and/or the service link 714. For example, the SAN may reduce the target SNR at which RL communications are to be received at the GW when the RF disturbances 810 are present in the feeder link 712, and may increase the target SNR (e.g., up to $SNR_0$) when the RF disturbances 810 lessen or are no longer present in the feeder link 712. Furthermore, the SAN may reduce the number of RBs allocated to the UT (e.g., for RL communications) when the RF disturbances 820 are present in the service link 714, and may increase the number of RBs allocated to the UT (e.g., up to $N_{RB0}$) when the RF disturbances 820 lessen or are no longer present in the service link 714. In some aspects, the SAN may dynamically adjust the target SNR at the GW and/or the number of RBs allocated to the UT per TTI.

It is noted that the dynamic link adaptation techniques described herein are not limited to satellite communication systems. For example, aspects of the present disclosure may be applicable to various other communication systems that include an RF intermediary acting as a transponder or relay between a transmitting device and a receiving device. In some implementations, aspects of the present disclosure may be used to perform link adaptation in a wireless communication system (e.g., such as a cellular communications network).

Figure 9:
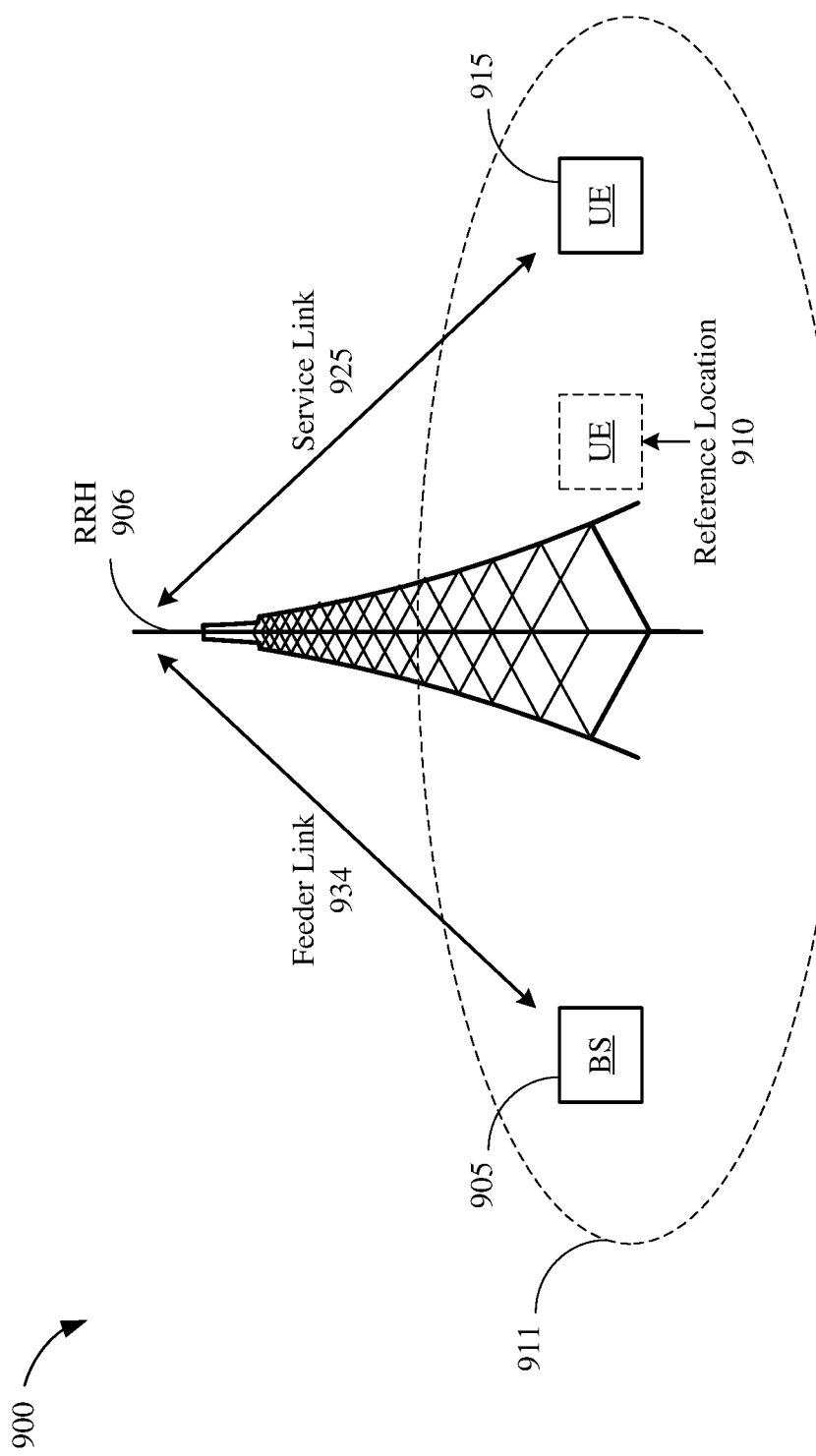
FIG. 9 shows an example wireless communication system within which aspects of the present disclosure may be implemented.

FIG. 9 shows an example wireless communication system 900 within which aspects of the present disclosure may be implemented. The wireless communication system 900 may include a base station 905, a user equipment (UE) 915, and a radio frequency (RF) remote radio head (RRH) 906. The base station 905 may perform radio configuration and scheduling for communication with the UE 915, or may operate under a cloud-based base station controller (not shown). In some aspects, the RRH 906 may facilitate wireless (RF) communications between the base station 905 and the UE 915.

In some implementations, the wireless communication system 900 may be or include a long term evolution (LTE) or LTE-Advanced (LTE-A) network. The wireless communication system 900 may also be or include a next generation network, such as a 5G wireless communication network. In LTE/LTE-A and 5G networks, the term evolved node B (eNB) may be generally used to describe the base station 905. The wireless communication system 900 may be a heterogeneous LTE/LTE-A or 5G network in which different types of eNBs provide coverage for various geographical regions. For example, each eNB or base station 905 may provide communication coverage for a macro cell, a small cell, or other types of cell. The term "cell" is a 3GPP term that can be used to describe a base station, a carrier or component carrier associated with the base station, or a coverage area (e.g., sector) of a carrier or base station, depending on the context.

The communication networks that may accommodate the wireless communication system 900 may be packet-based networks that operate according to a layered protocol stack and data in the user plane may be based on the IP. A radio link control (RLC) layer may perform packet segmentation and reassembly to communicate over logical channels. A media access control (MAC) layer may perform priority handling and multiplexing of logical channels into transport channels. The MAC layer may also use hybrid automatic repeat request (HARQ) feedback to provide retransmission at the MAC layer to improve link efficiency. In the control plane, the radio resource control (RRC) protocol layer may provide establishment, configuration, and maintenance of an RRC connection between the UE 915 and the base station 905. At the physical (PHY) layer, the transport channels may be mapped to physical channels.

The UE 915 may include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. The UE 915 may be a cellular phone, a smart phone, a personal digital assistant (PDA), a wireless modem, a wireless communication device, a handheld device, a tablet computer, a laptop computer, a cordless phone, a wireless local loop (WLL) station, a data card, a Universal Serial Bus (USB) dongle, a wireless router, etc. The UE 915 may be able to communicate with various types of base stations and network equipment including macro eNBs, small cell eNBs, relay base stations, and the like.

The base station 905 may communicate with the RRH 906 via a feeder link 934, and the UE 915 may communicate with the RRH 906 via a service link 925. The service link 925 may carry uplink (UL) transmissions from the UE 915 or downlink (DL) transmissions to the UE 915. The feeder link 934 may carry UL transmissions to the base station 905 or DL transmissions from the base station 905. The DL transmissions may also be called forward link (FL) transmissions, while the UL transmissions may also be called reverse link (RL) transmissions. Each of the communication links 925 and/or 934 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 925 and/or 934 may transmit bidirectional communications using frequency division duplex (FDD) (e.g., using paired spectrum resources) or time division duplex (TDD) (e.g., using unpaired spectrum resources) operation.

The RRH 906 may provide wireless communication coverage for a geographic coverage area 911. In some implementations, the RRH 906 may serve as an RF intermediary between the base station 905 and the UE 915. For example, the RRH 906 may be configured to perform frequency conversion and power amplification when retransmitting communication signals received from the base station 905 and/or the UE 915. Similar to the satellite 300, the RRH 906 may include one or more power amplifiers configured to amplify received signals so that the retransmitted signals are at a sufficiently high power level to be detected by the receiving device. Because the power amplifier in the RRH 906 also consumes power when amplifying received signals, the efficiency of the power amplifier may vary with respect to the amount of power in the received signal.

Aspects of the present disclosure may ensure that communication signals received by the RRH 906 have sufficient power to enable the power amplifier of the RRH 906 to operate at a target power efficiency. For example, the target power efficiency may correspond to an operating power in the linear region of the power amplifier's power efficiency curve (e.g., as described with respect to FIG. 7). The operating point of the power amplifier is defined by the PSD of the communication signals arriving at the RRH 906. Resource scheduling and power control decisions for the wireless communication system 900 may be managed by the base station 905 (or the cloud-based base station controller). Thus, the implementations described herein may allow the base station 905 to determine a set of operating parameters for UL communications, initiated by the UE 915, that allow the RRH 906 to achieve the target power efficiency. Further, aspects of the present disclosure may enable the base station 905 to dynamically adjust one or more of the operating parameters, while maintaining the target power efficiency of the RRH 906, to adapt to channel conditions in at least one of the feeder link 934 or the service link 925.

In some implementations, the base station 905 may determine a set of reference operating parameters for UL communications at which the RRH 906 may achieve the target power efficiency. In some aspects, one or more operating parameters may include a SNR for the UL communications to be received at the base station 905, a bandwidth allocation for the UL communications, or an MCS implemented by the UE 915 for transmitting the UL communications. The reference operating parameters may reflect an optimal configuration for each of the one or more operating parameters under ideal channel conditions (e.g., assuming no RF disturbances in the feeder link 934 or the service link 925). For example, the reference operating parameters may assume that the UE 915 transmits UL communications at its maximum transmit power using all available bandwidth (e.g., per component carrier) in the service link 925, and that the base station 905 receives the UL communications at the highest achievable SNR (e.g., when the RRH 906 operates at the target power efficiency).

To determine the set of reference operating parameters, the base station 905 may first select a reference location 910 for the UE 915 within the geographical coverage area 911 of the RRH 906. The reference location 910 may correspond to a location at which the UE 915 is able to transmit UL communications to the RRH 906 at maximum power using all of the available bandwidth to the UE 915. In some aspects, the reference location 910 may correspond to a location at which a distance between the UE 915 and the RRH 906 is shortest compared to other locations within the geographical coverage area 911. For example, the reference location 910 may substantially coincide with a point closest to the RRH 906. It is noted that the reference location 910 may differ from the actual location of the UE 915 at any given time.

In some implementations, the base station 905 may determine a target PSD at which the RRH 906 should receive UL communications from the UE 915 (e.g., to operate at the target power efficiency) based on the reference location 910 of the UE 915. In some aspects, the target PSD may correspond to a PSD needed to operate the RRH 906 at its optimal power efficiency (e.g., in the linear region at, or just before, the saturation point). Thus, the base station 905 may determine, based on the reference location 910 for the UE 915, a number of RBs that can be allocated to the UE 915 to achieve the target PSD when the UE 915 transmits UL signals at its maximum transmit power. The number of RBs that can be allocated to the UE 915, based on the reference location 910, may be referred to as a reference number of RBs. In some other aspects, the target PSD may correspond to the PSD of UL signals received at the RRH 906 when the UE 915 transmits the RL signals, from the reference location 910, at its maximum transmit power using all available bandwidth (e.g., per component carrier) in the service link 925. Accordingly, the reference number of RBs may correspond to the maximum number of RBs allocable to the UE 915.

In some implementations, the base station 905 may also determine a reference SNR at which UL communications can be received at the base station 905 based, at least in part, on the reference location 910 of the UE 915. For example, the reference SNR may correspond to the SNR of UL signals received at the base station 905 when the UE 915 transmits the UL signals, from the reference location 910, at its maximum transmit power using the reference number of RBs (e.g., to achieve the target PSD at the RRH 906). Thus, in some aspects, the reference SNR may represent the highest-achievable SNR at which UL communications can be received at the base station 905 while maintaining the target power efficiency of the RRH 906.

In some implementations, the base station 905 may determine a reference MCS index that can be implemented, by the UE 915, for transmitting UL communications from the reference location 910. For example, the reference MCS index may correspond to the maximum MCS index that the UE 915 may use to transmit UL communications, when transmitting at maximum power from the reference location 910, while maintaining at least a threshold BLER. More specifically, the reference MCS index may be a function of the reference number of RBs allocated for UL communications and the reference SNR at which the UL communications are expected to be received at the base station 905. Thus, in some aspects, the reference MCS index may represent the highest MCS index that can be supported by the target power efficiency of the RRH 906.

The reference operating parameters may represent an optimal configuration for UL communications between the UE 915 and the base station 905 under ideal channel conditions. However, in actual implementations, the base station 905 may dynamically adjust one or more of the operating parameters based on actual channel conditions in the feeder links 934 and/or service links 925. For example, RF disturbances in the feeder links 934 and/or service links 925 may cause signal attenuation in communications between the RRH 906 and the base station 905 and/or UE 915, respectively. In some implementations, the base station 905 may adjust one or more of the operating parameters (e.g., from their optimal configuration) to mitigate and/or compensate for RF disturbances in the wireless communication system 900 while maintaining the target power efficiency of the RRH 906.

RF disturbances in the feeder link 934 may reduce the SNR of UL communications arriving at the base station 905, whereas RF disturbances in the service link 925 may reduce the PSD of UL communications arriving at the RRH 906. In some implementations, the base station 905 may compensate for RF disturbances in the feeder link 925 while maintaining the target power efficiency of the RRH 906. Similarly, the base station 905 may compensate for RF disturbances in the service link 934 while also maintaining the target power efficiency of the RRH 906. By using the target power efficiency of the RRH 906 as a common reference point, the base station 905 may compensate for RF disturbances in each of the communication links 934 and 925, independently. For example, the base station 905 may ignore the channel conditions (e.g., including any RF disturbances that may be present) in the service link 925 when compensating for RF disturbances in the feeder link 934. Similarly, the base station 905 may ignore the channel conditions (e.g., including any RF disturbances that may be present) in the feeder link 934 when compensating for RF disturbances in the service link 925.

In some implementations, the base station 905 may compensate for RF disturbances in the feeder link 934 by reducing the target SNR at which UL communications are expected to be received at the base station 905 (e.g., in a similar manner as described above, with respect to FIG. 8A). By reducing the target SNR at which it expects to receive UL communications, the base station 905 may ensure that it is able to continue receiving UL communication signals (e.g., when the RRH 906 operates at its target power efficiency) with RF disturbances present in the feeder link 934. In some aspects, the base station 905 may adjust the MCS index used for UL communications based, at least in part, on changes to the target SNR. For example, the base station 905 may select the highest MCS index that can be used for the UL communications to achieve at least a threshold BLER while maintaining the target SNR at the base station 905. However, it is noted that the base station 905 may refrain from adjusting operating parameters that may affect the transmit power of UL communications in the service link 925 (such as the number of RB allocated to the UE 915) when compensating for RF disturbances in the feeder link 934.

In some implementations, the base station 905 may compensate for RF disturbances in the service link 925 by reducing the number of RBs allocated for UL communications (e.g., in a similar manner as described above, with respect to FIG. 8B). By reducing the number of RBs allocated to the UE 915 (e.g., for UL communications), the base station 905 may ensure that the RRH 906 is able to continue receiving UL communications at the target PSD (e.g., corresponding to the RRH's target power efficiency) with RF disturbances present in the service link 925. In some aspects, the base station 905 may adjust the MCS index used for UL communications based, at least in part, on changes to the number of RBs allocated to the UE 915. For example, the base station 905 may select a lower MCS index if the maximum number of RBs allocable to the UE 915 (e.g., to achieve the target PSD) is less than a threshold number of RBs needed to maintain a desired level of performance (e.g., due to reduced channel coding gain). Still further, in some aspects, the base station 905 may adjust the target SNR at which UL communications are expected to be received at the base station 905 when the maximum number of RBs allocable to the UE 915 is less than the threshold number of RBs. For example, the base station 905 may reduce the target SNR in order to maintain the threshold BLER (e.g., for UL communications received at the base station 905) when the UE 915 implements the new MCS index. This new target SNR may override or replace the target SNR determined based on RF disturbances in the feeder link 934 (e.g., described above).

In some implementations, the base station 905 may dynamically adjust the one or more operating parameters in response to changing channel conditions in the feeder link 934 and/or the service link 925. For example, the base station 905 may reduce the target SNR at which UL communications are to be received at the base station 905 when RF disturbances are present in the feeder link 934, and may increase the target SNR (e.g., up to the reference SNR) when the RF disturbances less or are no longer present in the feeder link 934. Furthermore, the base station 905 may reduce the number of RBs allocated to the UE 915 (e.g., for UL communications) when RF disturbances are present in the service link 934, and may increase the number of RBs allocated to the UE 915 (e.g., up to the reference number of RBs) when the RF disturbances less or are no longer present in the service link 934. In some aspects, the base station 905 may dynamically adjust the target SNR at the base station 905 and/or the number of RBs allocated to the UE 915 per TTI.

Figure 10:
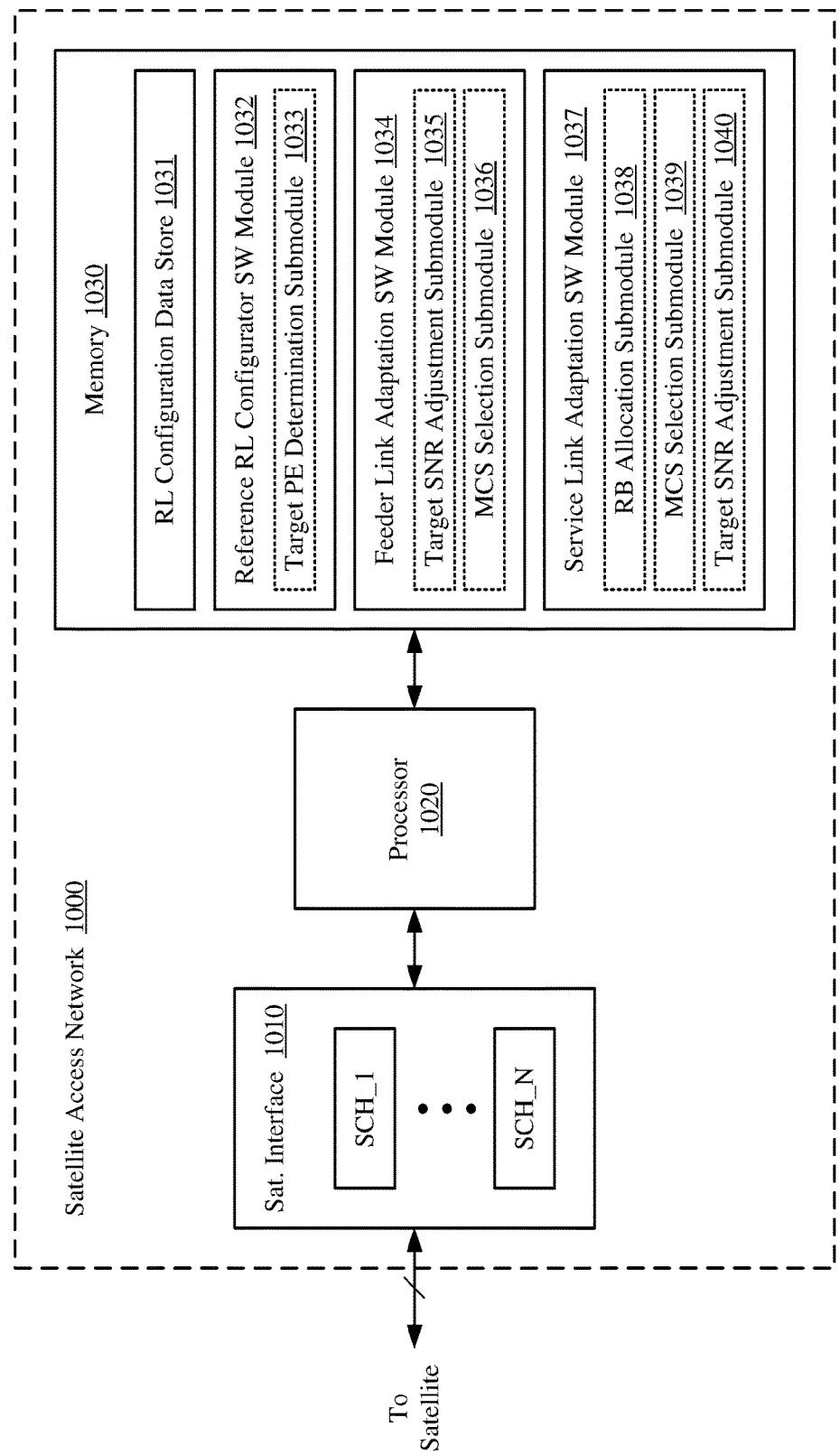
FIG. 10 shows a block diagram of an example satellite access network in accordance with example implementations.

FIG. 10 shows a block diagram of an example satellite access network (SAN) 1000 in accordance with example implementations. For purposes of discussion herein, the SAN 1000 may be an example of (or implemented within) the SAN 150 of FIG. 1. The SAN 1000 includes a satellite interface 1010, a processor 1020, and memory 1030. The satellite interface 1010 may be configured to communicate with a particular satellite (e.g., satellite 300 of FIG. 1). Furthermore, the satellite interface 010 may include a number of schedulers SCH_1-SCN_N that control and/or schedule communications via one or more gateways. For some implementations, the SAN 1000 may include other circuitry and/or components in addition to those shown in FIG. 10.

Memory 1030 includes an RL configuration data store 1031 that may store one or more operating parameters for RL communications between the SAN 1000 and a particular UT (not shown). Example operating parameters may include a target SNR at which the RL communications are to be received by the SAN 1000, a number of RBs allocated for the RL communications, and/or an MCS to be implemented by the UT for the RL communications. The memory 1030 may also include a non-transitory computer-readable storage medium (e.g., one or more nonvolatile memory elements, such as EPROM, EEPROM, Flash memory, a hard drive, etc.) that may store the following software (SW) modules:

a reference RL configuration SW module 1032 to determine a set of reference operating parameters for RL communications, between the SAN 1000 and a corresponding UT, to achieve a target power efficiency of a satellite acting as an RF intermediary for the RL communications, the reference RL configuration SW module 1032 including:
 a target power efficiency (PE) determination submodule 1035 to determine the target power efficiency based, at least in part, on a reference location for the UT within a footprint of the satellite;

a feeder link adaptation SW module 1034 to dynamically adjust one or more operating parameters for the RL communications based on channel conditions in the feeder link while maintaining the target power efficiency of the satellite, the feeder link adaptation SW module 1034 including:
   a target SNR adjustment submodule 1035 to adjust the target SNR at which RL communications are to be received at the SAN 1000 based on the channel conditions in the feeder link, independent of the channel conditions in the service link; and
   an MCS selection submodule 1036 to adjust the MCS index used for the RL communications based, at least in part, on changes to the target SNR at the SAN 1000; and
a service link adaption SW module 1037 to dynamically adjust one or more operating parameters for the RL communications based on channel conditions in the service link while maintaining the target power efficiency of the satellite, the service link adaptation SW module 1037 including:
   a resource block (RB) allocation submodule 1038 to adjust the number of RBs allocated to the UT, for transmitting the RL communications, based on the channel conditions in the service link, independent of the channel conditions in the feeder link;
   an MCS selection submodule 1039 to adjust the MCS index used for the RL communications based, at least in part, on changes to the number of RBs allocated to the UT; and
   a target SNR adjustment submodule 1040 to adjust the target SNR at which RL communications are to be received at the SAN 1000 based, at least in part, on changes to the MCS index.

Each software module includes instructions that, when executed by processor 1020, cause the SAN 1000 to perform the corresponding functions. The non-transitory computer-readable medium of memory 1030 thus includes instructions for performing all or a portion of the operations of FIGS. 11 and 12. In at least some implementations, the functions performed by executing the reference RL configuration SW module 1032, the feeder link adaptation SW module 1034, and/or the service link adaptation SW module 1037 may correspond to and/or may be performed by the dynamic RL adaptation logic 152 of FIG. 1.

Processor 1020 may be any suitable one or more processors capable of executing scripts or instructions of one or more software programs stored in the SAN 1000 (e.g., within memory 1030). For example, processor 1020 may execute the reference RL configuration SW module 1032 to determine a set of reference operating parameters for RL communications, between the SAN 1000 and a corresponding UT, to achieve a target power efficiency of a satellite acting as an RF intermediary for the RL communications. In executing the reference RL configuration SW module 1032, the processor 1020 may further execute the target PE determination submodule 1035 to determine the target power efficiency for the satellite based, at least in part, on a reference location for the UT within a footprint of the satellite.

Processor 1020 may execute the feeder link adaptation SW module 1034 to dynamically adjust one or more operating parameters for the RL communications based on channel conditions in the feeder link, while maintaining the target power efficiency of the satellite. In executing the feeder link adaptation SW module 1034, the processor 1020 may further execute the target SNR adjustment submodule 1035 and/or the MCS selection submodule 1036. For example, the processor 1020 may execute the target SNR adjustment submodule 1035 to adjust the target SNR at which RL communications are to be received at the SAN 1000 based on the channel conditions in the feeder link, independent of the channel conditions in the service link. In some aspects, the processor 1020 may execute the MCS selection submodule 1036 to adjust the MCS index used for the RL communications based, at least in part, on changes to the target at the SAN 1000.

Processor 1020 may execute the service link adaptation SW module 1037 to dynamically adjust one or more operating parameters for the RL communications based on channel conditions in the service link, while maintaining the target power efficiency of the satellite. In executing the service link adaptation SW module 1037, the processor 1020 may further execute the RB allocation submodule 1038, the MCS selection submodule 1039, and/or the target SNR adjustment submodule 1040. For example, the processor 1020 may execute the RB allocation submodule 1038 to adjust the number of RBs allocated to the UT, for transmitting the RL communications, based on the channel conditions in the service link, independent of the channel conditions in the feeder link. In some aspects, the processor 1020 may execute the MCS selection submodule 1039 to adjust the MCS index used for the RL communications based, at least in part, on changes to the number of RBs allocated to the UT. Still further, in some aspects, the processor 1020 may execute the target SNR adjustment submodule 1040 to adjust the target SNR at which RL communications are to be received at the SAN 1000 based, at least in part, on changes to the MCS index.

Figure 11:
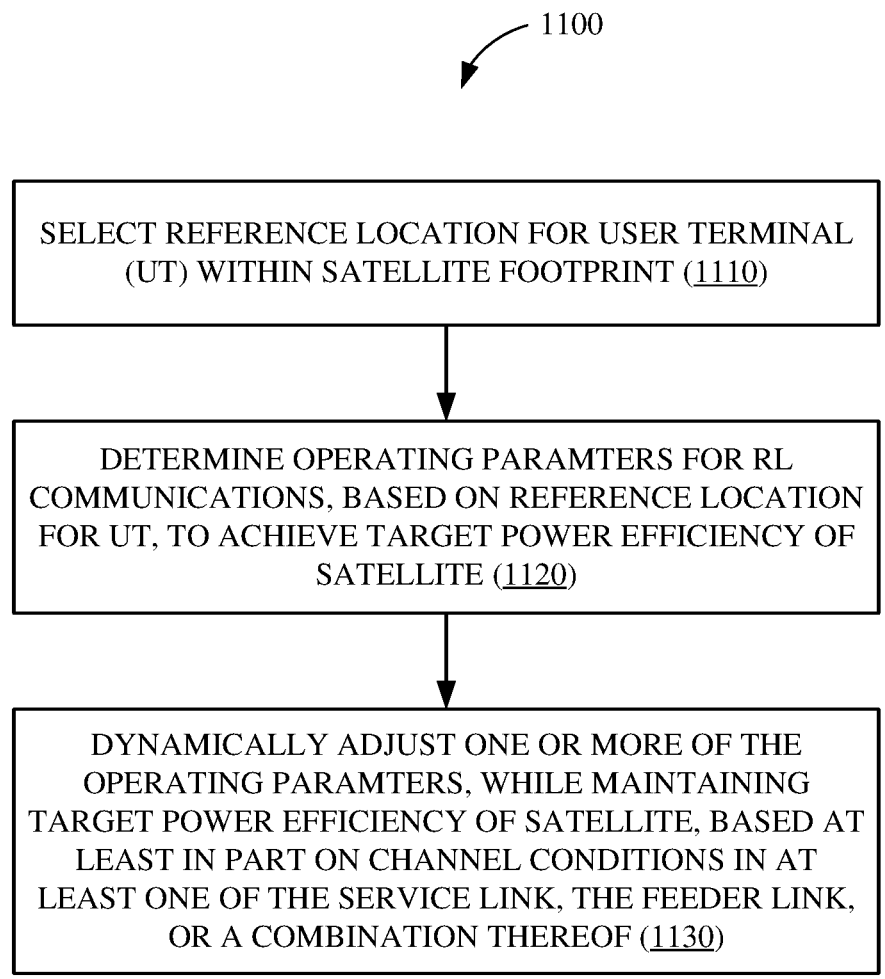
FIG. 11 shows an illustrative flowchart depicting an example reverse link adaptation operation for a satellite communication system.

FIG. 11 shows an illustrative flowchart depicting an example reverse link adaptation operation 1100 for a satellite communication system. The example operation 1100 may be performed by the SAN 1000 depicted in FIG. 10. However, it is to be understood that example operation 1100 may be performed by other suitable SANs and/or by any suitable components of the SAN 150 of FIG. 1.

The SAN 1000 may first select a reference location for a user terminal (UT) within the footprint of a corresponding satellite of a satellite communication system (1110). For example, the reference location may correspond to a location at which the UT is able to transmit RL communications to the satellite at maximum power using all of the bandwidth available to the UT. In some aspects, the reference location may correspond to a location at which a distance between the UT and the satellite is shortest compared to other locations within the footprint of the satellite. For example, the reference location may coincide with the center of a beam coverage area in which the UT is located. It is noted that the reference location may differ from the actual location of the UT at any given time.

The SAN 1000 may then determine a set of operating parameters for RL communications, based on the reference location for the UT, to achieve a target power efficiency of the satellite (1120). For example, one or more operating parameters may include a target SNR at which the RL communications are to be received at the SAN 1000, a number of RBs allocated for the RL communications, or an MCS implemented by the UT for transmitting the RL communications. In some implementations, the SAN 1000 may determine a set of reference operating parameters based on the reference location for the UT (such as described with respect to FIG. 7). The reference operating parameters may reflect an optimal configuration for each of the one or more operating parameters, under ideal channel conditions, when the UT initiates RL transmissions from the reference location. For example, the reference operating parameters may assume that the UT transmits RL communications at its maximum transmit power using all available bandwidth (e.g., per component carrier) in the service link, and that the SAN 1000 receives the RL communications at the highest achievable SNR. The target power efficiency for the satellite may correspond with the PSD at which RL communications are received at the satellite under the set of reference operating parameters (e.g., the target PSD).

Further, the SAN 1000 may dynamically adjust one or more of the operating parameters, while maintaining the target power efficiency of the satellite, based at least in part on channel conditions in at least one of the service link, the feeder link, or a combination thereof (1130). For example, RF disturbances (such as rain fade, antenna beam pointing errors, line-of-sight blockage, and/or Doppler effects) in the feeder link and/or service link of the satellite communication system may cause signal attenuation in communications between the satellite and the SAN 1000 and/or UT, respectively. In some aspects, the SAN 1000 may compensate for RF disturbances in the service link, independent of the channel conditions in the feeder link. In some other aspects, the SAN 1000 may compensate for RF disturbances in the feeder link, independent of the channel conditions in the service link. In some implementations, the SAN 1000 may periodically adjust the one or more operating parameters to adapt to changing channel conditions in the feeder link and/or the service link (e.g., per TTI).

Figure 12:
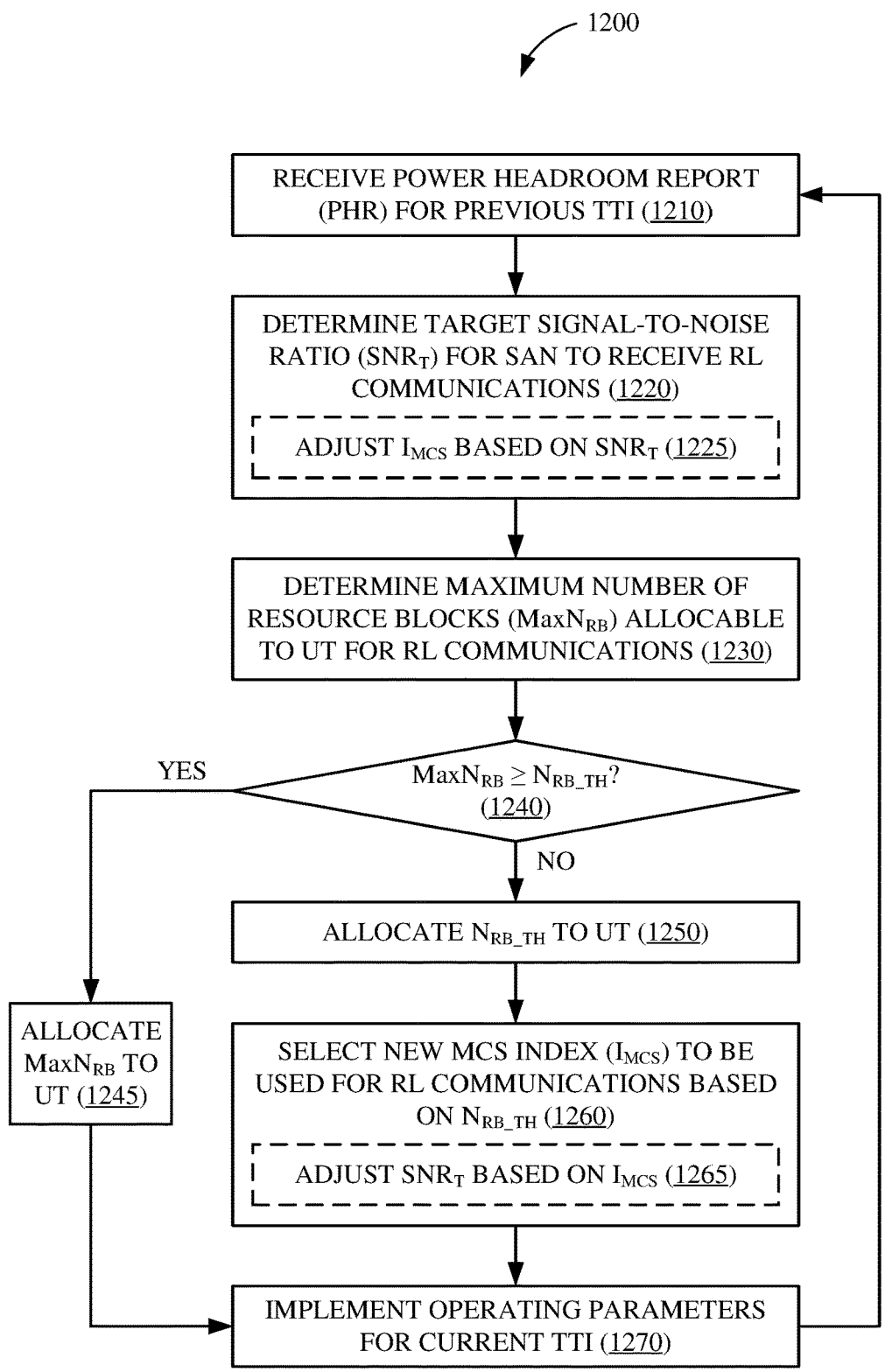
FIG. 12 shows an illustrative flowchart depicting an example operation for dynamically adjusting one or more operating parameters for RL communications based on RF disturbances in a satellite communication system.

FIG. 12 shows an illustrative flowchart depicting an example operation 1200 for dynamically adjusting one or more operating parameters for RL communications based on RF disturbances in a satellite communication system. The example operation 1200 may be performed by the SAN 1000 depicted in FIG. 10. However, it is to be understood that the example operation 1200 may be performed by any other suitable SANs and/or by any suitable components of the SAN 150 of FIG. 1.

The SAN 1000 may receive a power headroom (PHR) report for a previous TTI (1210). In some implementations, the SAN 1000 may determine a power budget of a corresponding UT based on the PHR received from the UT. For example, the PHR may indicate an availability (or deficit) of transmit power at the UT based on an existing bandwidth allocation for the UT (e.g., from the previous TTI).

The SAN 1000 may determine a target signal-to-noise ratio ($SNR_T$) at which RL communications are to be received at the SAN 1000 (1220). For example, RF disturbances in the feeder link may reduce the SNR of RL communications arriving at the SAN 1000. In some implementations, the SAN 1000 may compensate for RF disturbances in the feeder link by reducing the target SNR at which it expects to receive RL communications (such as described with respect to FIG. 8A). By reducing the target SNR, the SAN 1000 may ensure that it is able to continue receiving RL communication signals (e.g., when the satellite operates at a target power efficiency) with RF disturbances present in the feeder link. In some aspects, the SAN 1000 may determine, based on feeder link fade estimates, an amount of change in the SNR of received RL communications caused by RF disturbances in the feeder link. The SAN 1000 may then reduce the target SNR based on the estimated change in SNR due to RF disturbances in the feeder link.

In some aspects, the SAN 1000 may adjust the MCS index ($I_{MCS}$) used for RL communications based, at least in part, on changes to the target SNR (1225). For example, the SAN 1000 may select the highest MCS index that can be used for the RL communications to achieve at least a threshold BLER while maintaining the target SNR for RL communications arrive at the SAN 1000 (such as described with respect to FIG. 8A). It is noted that the SAN 1000 may compensate for RF disturbances in the feeder link, independent of the channel conditions in the service link. Thus, the SAN 1000 may refrain from adjusting operating parameters that may affect the transmit power of RL communications in the service link when compensating for RF disturbances in the feeder link.

The SAN 1000 may then determine a maximum number of resource blocks ($MaxN_{RB}$) allocable to the UT for RL communications (1230). For example, RF disturbances in the service link may reduce the PSD of RL communications arriving at the satellite. In some implementations, the SAN 1000 may compensate for RF disturbances in the service link by reducing the number of RBs allocated to the UT for RL communications (such as described with respect to FIG. 8B). By reducing the number of RBs allocated to the UT, the SAN 1000 may ensure that the satellite is able to continue receiving RL communications at the target PSD (e.g., corresponding to the satellite's target power efficiency) with RF disturbances present in the service link. In some aspects, the SAN 1000 may determine, based on the amount of available transmit power in the UT (e.g., from the received PHR), the maximum number of RBs that can be allocated for RL communications to maintain a target PSD (e.g., per RB) at the satellite.

In some implementations, the SAN 1000 may further compare the maximum number of RBs allocable to the UT with a threshold number of RBs ($N_{RB\_TH}$) (1240). For example, the threshold number of RBs may correspond to a minimum number of RBs needed to maintain a desired level of performance. Thus, reducing RB allocation below the threshold number of RBs may cause a substantial degradation in performance (e.g., due to reduced channel coding gain). If the maximum number of RBs currently allocable to the UT is greater than or equal to a threshold number of RBs (as tested at 1240), the SAN 1000 may allocate the maximum number of RBs to the UT (1245) and implement the current operating parameters for RL communications during the current TTI (1270). However, if the maximum number of RBs currently allocable to the UT is less than the threshold number of RBs (as tested at 1240), the SAN 1000 may allocate the threshold number of RBs to the UT (1250).

When the maximum number of RBs allocable to the UT is less than the threshold number of RBs, the SAN 1000 may further select a new MCS index ($I_{MCS}$) to be used for RL communications based on the threshold number of RBs allocated to the UT (1260). For example, the SAN 1000 may select a lower MCS index (e.g., compared to the MCS index used during the previous TTI) in order to maintain the target PSD at which RL communications are received at the satellite when the UT transmits the RL communications via the threshold number of RBs (such as described with respect to FIG. 8B). In some aspects, the SAN 1000 may further adjust the target SNR at which it expects to receive RL communications based, at least in part, on the new MCS index (1265). For example, the SAN 1000 may reduce the target SNR in order to maintain a threshold BLER, for RL communications received at the SAN 1000, when the UT implements the new MCS index. The new target SNR may override or replace the target SNR determined based on RF disturbances in the feeder link (e.g., at 1220).

Finally, the SAN 1000 may implement the current operating parameters for the current TTI (1270). In some implementations, the SAN 1000 may periodically adjust one or more of the operating parameters in response to changing channel conditions in the feeder link and/or service link (e.g., per TTI). For example, the SAN 1000 may repeat the example operation 1200 on a per-TTI basis such that the RL communications may adaptively compensate for the presence and/or absence of RF disturbances in the satellite communication system.

Figure 13:
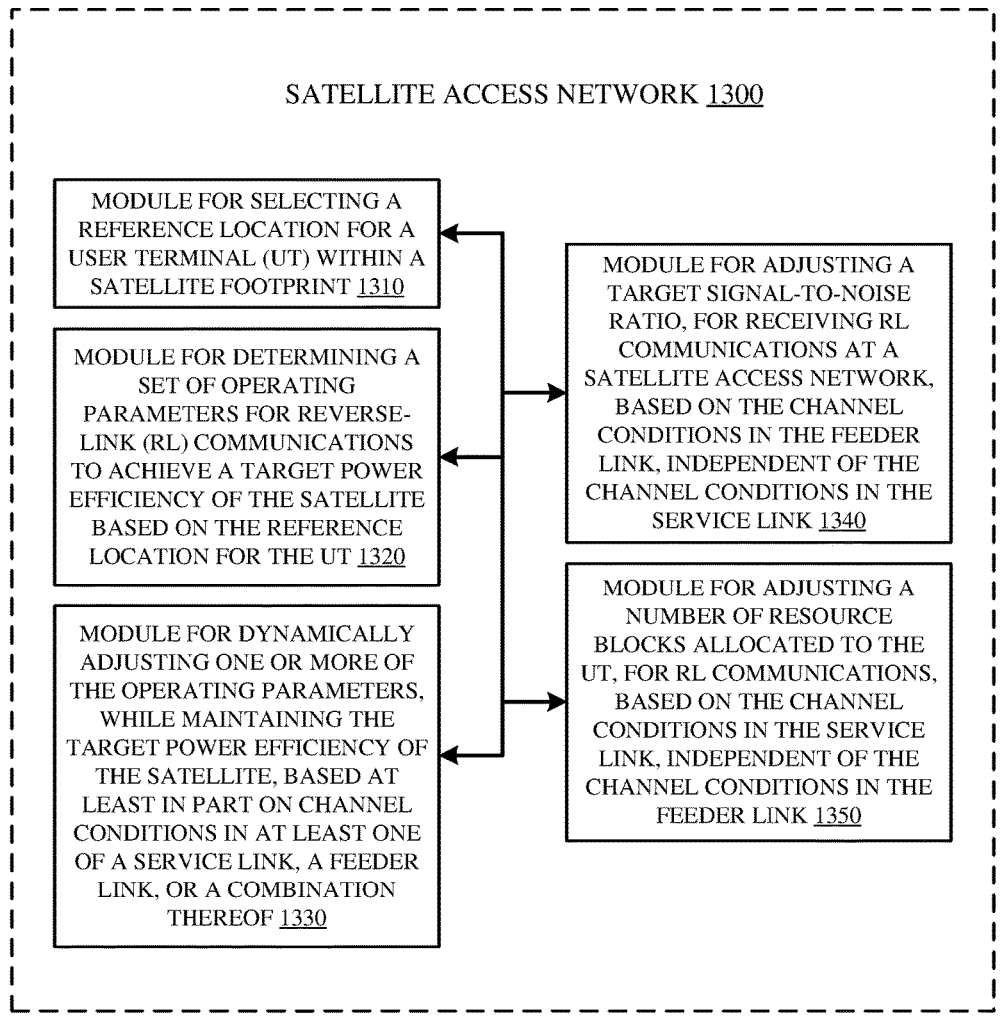
FIG. 13 shows an example satellite access network represented as a series of interrelated functional modules.

FIG. 13 shows an example satellite access network 1300 represented as a series of interrelated functional modules. A module 1310 for selecting a reference location for a user terminal (UT) within the footprint of a satellite, of a satellite communication system, may correspond at least in some aspects to, for example, a processor as discussed herein (e.g., processor 1020). A module 1320 for determining a set of operating parameters for reverse-link (RL) communications to achieve a target power efficiency of the satellite, based on the reference location for the UT, may correspond at least in some aspects to, for example, a processor as discussed herein (e.g., processor 1020). A module 1330 for dynamically adjusting one or more of the operating parameters, while maintaining the target power efficiency of the satellite, based at least in part on channel conditions in at least one of a service link, a feeder link, or a combination thereof may correspond at least in some aspects to, for example, a processor as discussed herein (e.g., processor 1020). A module 1340 for adjusting a target signal-to-noise ratio (SNR) for receiving RL communications at the satellite access network 1300 based on the channel conditions in the feeder link, independent of the channel conditions in the service link, may correspond at least in some aspects to, for example, a processor as discussed herein (e.g., processor 1020). A module 1350 for adjusting a number of resource blocks allocated to the UT, for RL communications, based on the channel conditions in the service link, independent of the channel conditions in the feeder link, may correspond at least in some aspects to, for example, a processor as discussed herein (e.g., processor 1020).

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of link adaptation in a satellite communication system, comprising:
   selecting a reference location for a user terminal (UT) within a footprint of a satellite of the satellite communication system, wherein the satellite is configured to receive reverse-link (RL) communications from the UT via a service link and retransmit the RL communications to a satellite access network (SAN) via a feeder link;

determining a set of operating parameters for the RL communications to achieve a target power efficiency of the satellite based on the reference location for the UT; and dynamically adjusting one or more of the operating parameters, while maintaining the target power efficiency of the satellite, based at least in part on channel conditions in at least one of the service link, the feeder link, or a combination thereof.

2. The method of claim 1, wherein a distance between the UT and the satellite is shortest at the reference location compared to other locations within the footprint of the satellite.

3. The method of claim 1, wherein the one or more operating parameters includes a target signal-to-noise ratio (SNR) for receiving the RL communications at the SAN, a number of resource blocks (RBs) allocated for the RL communications, or a modulation and coding scheme (MCS) used to transmit the RL communications.

4. The method of claim 3, wherein the dynamically adjusting comprises:
adjusting the target SNR based on the channel conditions in the feeder link, independent of the channel conditions in the service link.

5. The method of claim 3, wherein the dynamically adjusting comprises:
adjusting the number of RBs based on the channel conditions in the service link, independent of the channel conditions in the feeder link.

6. The method of claim 5, wherein the target power efficiency corresponds with a target power spectral density (PSD) at which RL communications arrive at the satellite when the UT transmits the RL communications, from the reference location, at maximum power using all available bandwidth in the service link.

7. The method of claim 6, wherein adjusting the number of RBs comprises:
determining that an amount of available transmit power in the UT is less than an amount of additional transmit power needed to achieve the target PSD; and
reducing the number of RBs allocated for the RL communications based on the amount of additional transmit power needed to achieve the target PSD.

8. The method of claim 7, wherein the amount of additional transmit power needed to achieve the target PSD corresponds to an amount of transmit power needed per RB.

9. The method of claim 6, further comprising:
determining a maximum number of RBs allocable for the RL communications based at least in part on the target PSD;
comparing the maximum number of RBs to a threshold number of RBs; and
selecting the number of RBs to be allocated for the RL communications based at least in part on the comparison.

10. The method of claim 9, wherein the selecting comprises:
allocating the maximum number of RBs for the RL communications when the maximum number of RBs is greater than or equal to the threshold number of RBs; and
allocating the threshold number of RBs for the RL communications when the maximum number RBs is less than the threshold number of RBs.

11. A satellite access network (SAN) comprising:
one or more processors; and
a memory configured to store instructions that, when executed by the one or more processors, cause the SAN to:
select a reference location for a user terminal (UT) within a footprint of a satellite of a satellite communication system, wherein the satellite is configured to receive reverse-link (RL) communications from the UT via a service link and retransmit the RL communications to the SAN via a feeder link;
determine a set of operating parameters for the RL communications to achieve a target power efficiency of the satellite based on the reference location for the UT; and
dynamically adjust one or more of the operating parameters, while maintaining the target power efficiency of the satellite, based at least in part on channel conditions in at least one of the service link, the feeder link, or a combination thereof.

12. The satellite access network of claim 11, wherein a distance between the UT and the satellite is shortest at the reference location compared to other locations within the footprint of the satellite.

13. The satellite access network of claim 11, wherein the one or more operating parameters includes a target signal-to-noise ratio (SNR) for receiving the RL communications at the SAN, a number of resource blocks (RBs) allocated for the RL communications, or a modulation and coding scheme (MCS) used to transmit the RL communications.

14. The satellite access network of claim 13, wherein execution of the instructions to dynamically adjust the one or more operating parameters causes the SAN to:
adjust the target SNR based on the channel conditions in the feeder link, independent of the channel conditions in the service link; and
adjust the number of RBs based on the channel conditions in the service link, independent of the channel conditions in the feeder link.

15. The satellite access network of claim 14, wherein the target power efficiency corresponds with a target power spectral density (PSD) at which RL communications arrive at the satellite when the UT transmits the RL communications, from the reference location, at maximum power using all available bandwidth in the service link.

16. The satellite access network of claim 15, wherein execution of the instructions to adjust the number of RBs causes the SAN to:
determine that an amount of available transmit power in the UT is less than an amount of additional transmit power needed to achieve the target PSD; and
reduce the number of RBs allocated for the RL communications based on the amount of additional transmit power needed to achieve the target PSD.

17. The satellite access network of claim 16, wherein the amount of additional transmit power needed to achieve the target PSD corresponds to an amount of transmit power needed per RB.

18. The satellite access network of claim 15, wherein execution of the instructions further causes the SAN to:
determine a maximum number of RBs allocable for the RL communications based at least in part on the target PSD;
compare the maximum number of RBs to a threshold number RBs; and select the number of RBs to be allocated for the RL communications based at least in part on the comparison.

19. The satellite access network of claim 18, wherein execution of the instructions to select the number of RBs causes the SAN to:
    allocate the maximum number of RBs for the RL communications when the maximum number of RBs is greater than or equal to the threshold number of RBs; and
    allocate the threshold number of RBs for the RL communications when the maximum number of RBs is less than the threshold number of RBs.

20. A satellite access network (SAN) comprising:
    means for selecting a reference location for a user terminal (UT) within a footprint of a satellite of a satellite communication system, wherein the satellite is configured to receive reverse-link (RL) communications from the UT via a service link and retransmit the RL communications to the SAN via a feeder link;
    means for determining a set of operating parameters for the RL communications to achieve a target power efficiency of the satellite based on the reference location for the UT; and
    means for dynamically adjusting one or more of the operating parameters, while maintaining the target power efficiency of the satellite, based at least in part on channel conditions in at least one of the service link, the feeder link, or a combination thereof.

21. The satellite access network of claim 20, wherein the means for dynamically adjusting the one or more operating parameters comprises:
    means for adjusting a target signal-to-noise ratio (SNR) for receiving the RL communications at the SAN based on the channel conditions in the feeder link, independent of the channel conditions in the service link; and
    means for adjusting a number of resource blocks (RBs) allocated for the RL communications based on the channel conditions in the service link, independent of the channel conditions in the feeder link.

22. The satellite access network of claim 21, wherein the target power efficiency corresponds with a target power spectral density (PSD) at which RL communications arrive at the satellite when the UT transmits the RL communications, from the reference location, at maximum power using all available bandwidth in the service link.

23. The satellite access network of claim 22, wherein the means for adjusting the number of RBs comprises:
    means for determining that an amount of available transmit power in the UT is less than an amount of additional transmit power needed to achieve the target PSD; and
    means for reducing the number of RBs allocated for the RL communications based on the amount of additional transmit power needed to achieve the target PSD.

24. The satellite access network of claim 23, wherein the amount of additional transmit power needed to achieve the target PSD corresponds to an amount of transmit power needed per RB.

25. The satellite access network of claim 22, further comprising:
    means for determining a maximum number of RBs allocable for the RL communications based at least in part on the target PSD;
    means for comparing the maximum number of RBs to a threshold number of RBs;
    means for allocating the maximum number of RBs for the RL communications when the maximum number of RBs is greater than or equal to the threshold number RBs; and
    means for allocating the threshold number of RBs for the RL communications when the maximum number of RBs is less than the threshold number of RBs.

26. A method of link adaptation in a wireless communication system, comprising:
    selecting a reference location for a user equipment (UE) within a geographic coverage area of a remote radio head (RRH) of the wireless communication system, wherein the RRH is configured to receive uplink (UL) communications from the UE via a service link and retransmit the UL communications to a base station via a feeder link;
    determining a set of operating parameters for the UL communications to achieve a target power efficiency of the RRH based on the reference location for the UE; and
    dynamically adjusting one or more of the operating parameters, while maintaining the target power efficiency of the RRH, based at least in part on channel conditions in at least one of the service link, the feeder link, or a combination thereof.

27. The method of claim 26, wherein the target power efficiency corresponds with a target power spectral density (PSD) at which UL communications arrive at the RRH when the UE transmits the UL communications, from the reference location, at maximum power using all available bandwidth in the service link, and wherein the dynamically adjusting comprises:
    adjusting a target signal-to-noise ratio (SNR) for receiving the UL communications at the base station based on the channel conditions in the feeder link, independent of the channel conditions in the service link; and
    adjusting a number of resource blocks (RBs) allocated for the UL communications based on the channel conditions in the service link, independent of the channel conditions in the feeder link.

28. The method of claim 27, wherein adjusting the number of RBs comprises:
    determining that an amount of available transmit power in the UE is less than an amount of additional transmit power needed to achieve the target PSD; and
    reducing the number of RBs allocated for the UL communications based on the amount of additional transmit power needed to achieve the target PSD.

29. The method of claim 28, wherein the amount of additional transmit power needed to achieve the target PSD corresponds to an amount of transmit power needed per RB.

30. The method of claim 27, further comprising:
    determining a maximum number of RBs allocable for the UL communications based at least in part on the target PSD;
    comparing the maximum number of RBs to a threshold number of RBs;
    allocating the maximum number of RBs for the UL communications when the maximum number of RBs is greater than or equal to the threshold number of RBs; and
    allocating the threshold number of RBs for the UL communications when the maximum number of RBs is less than the threshold number of RBs.

* * * * *